Sept. 20, 1960 R. H. BREEBACK 2,953,169
FILLING MACHINE
Filed April 9, 1956 10 Sheets-Sheet 6

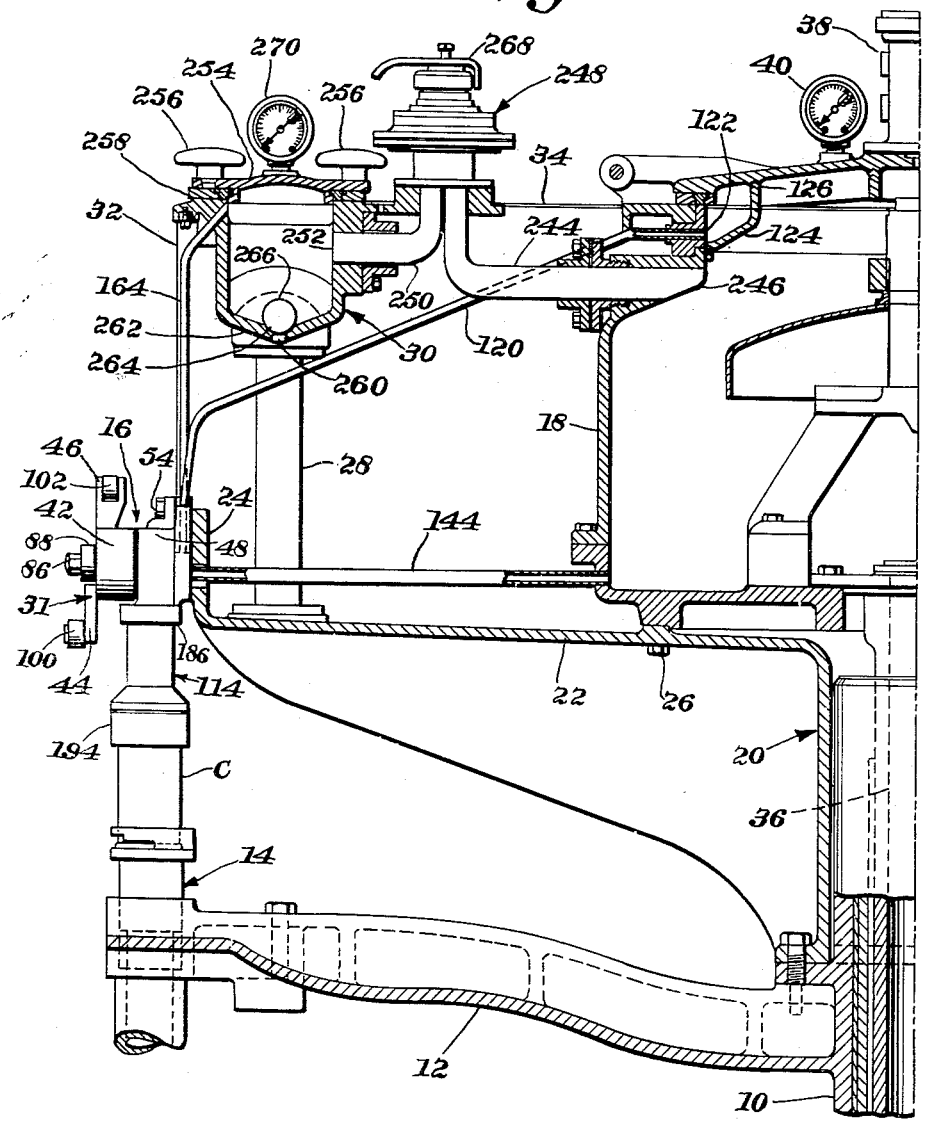

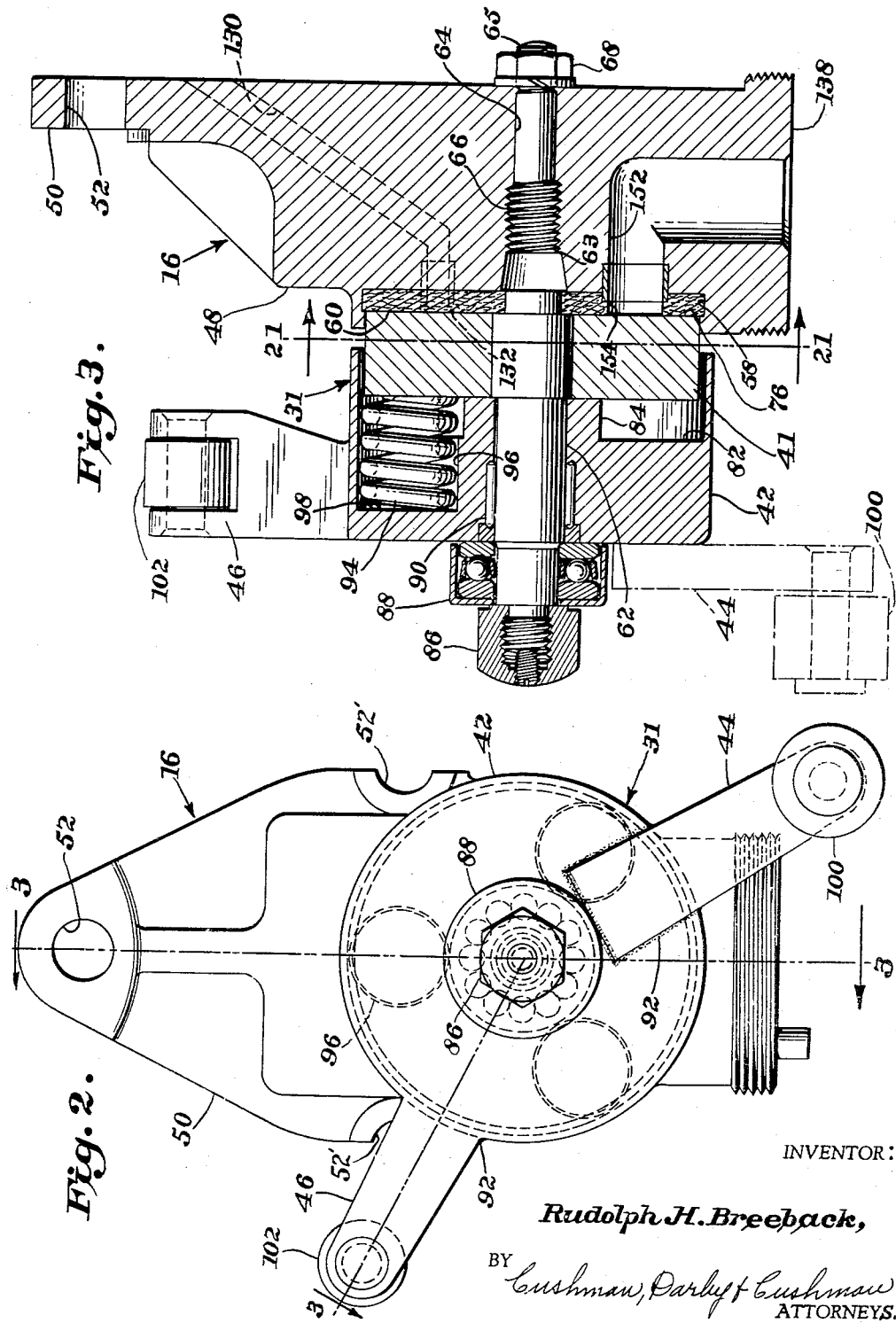

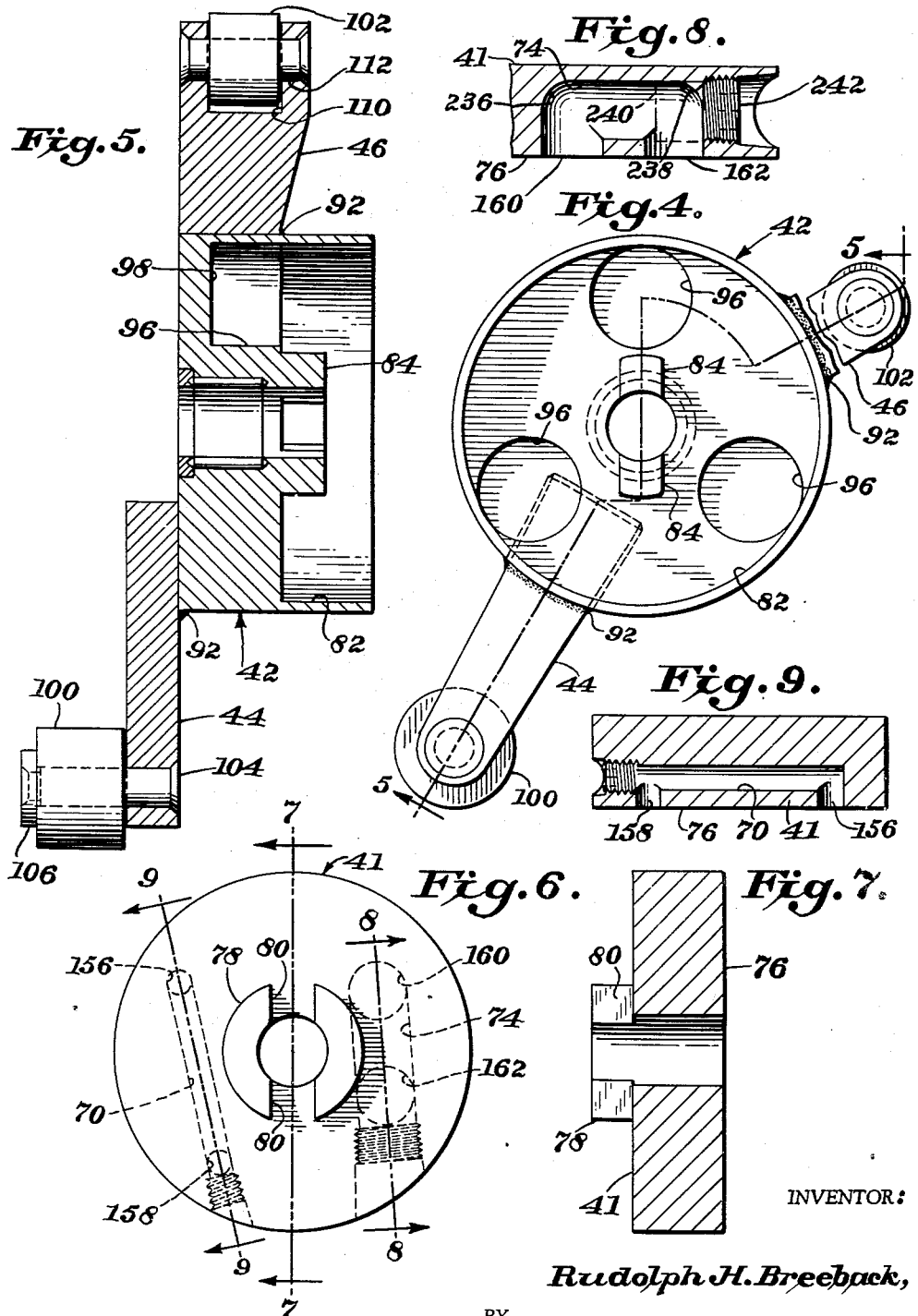

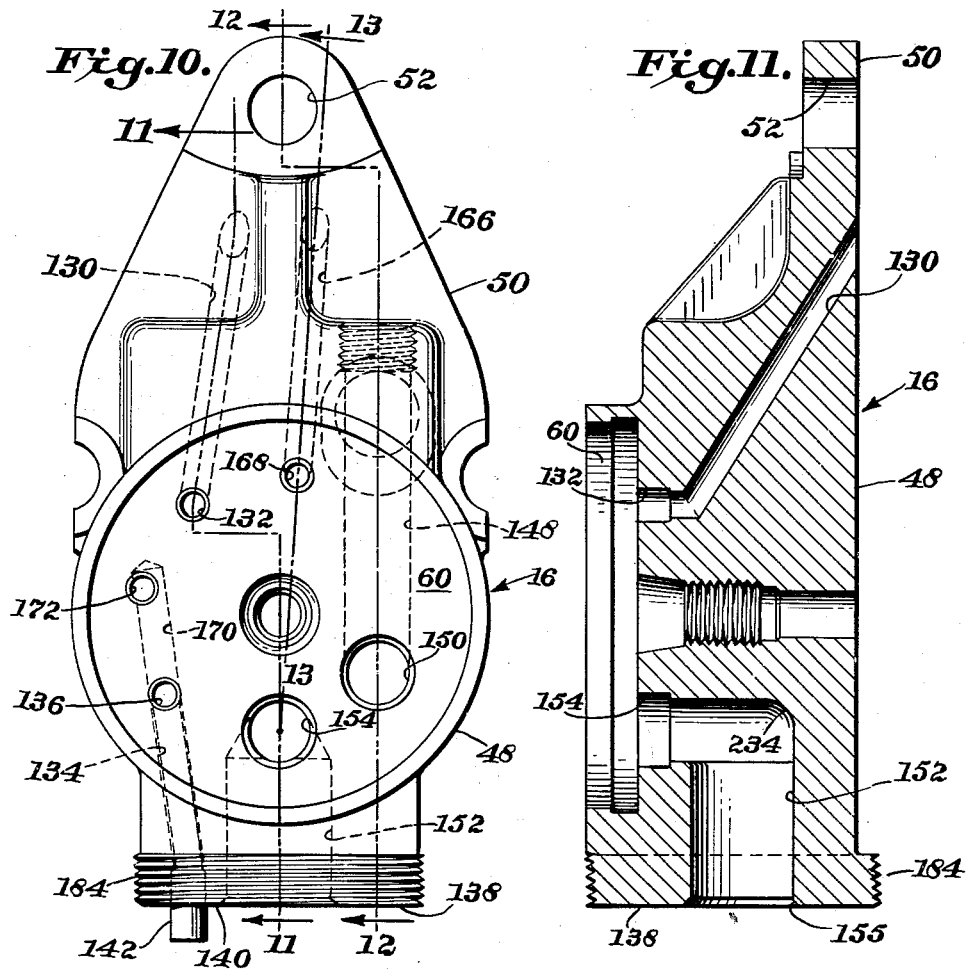
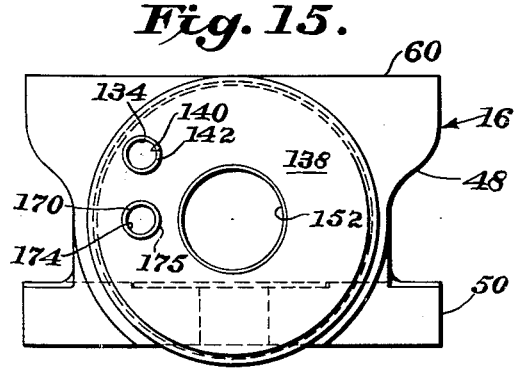

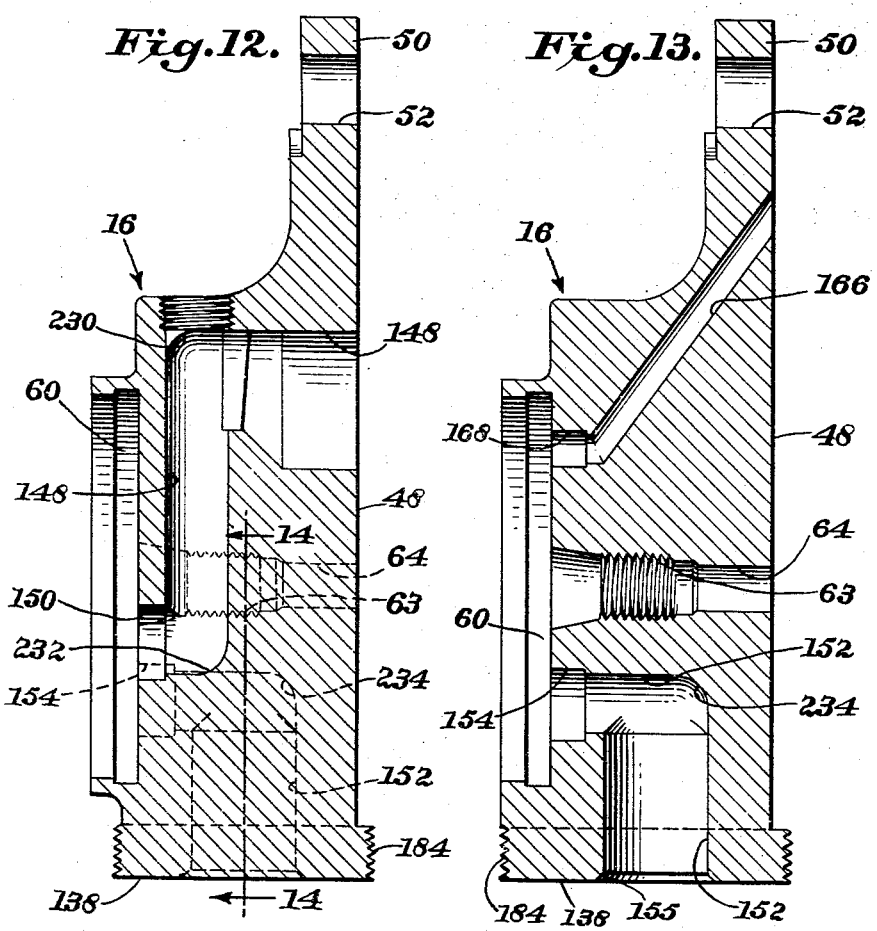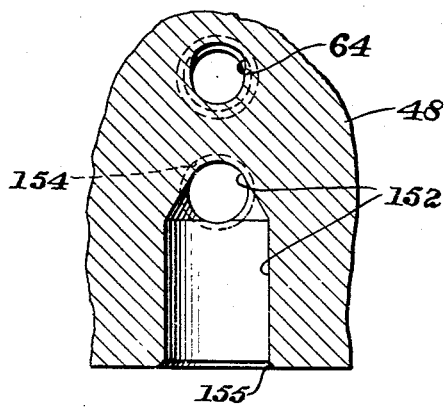

INVENTOR:
Rudolph H. Breeback,
BY Cushman, Darby & Cushman
ATTORNEYS

Sept. 20, 1960
R. H. BREEBACK
2,953,169
FILLING MACHINE
Filed April 9, 1956
10 Sheets-Sheet 7
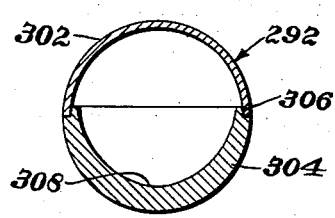
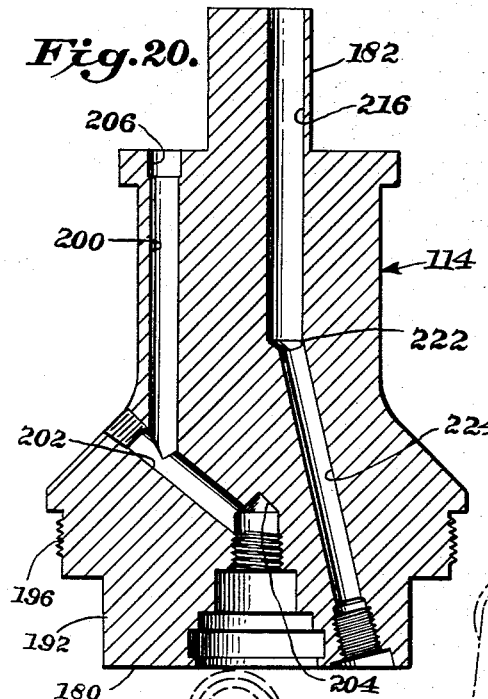
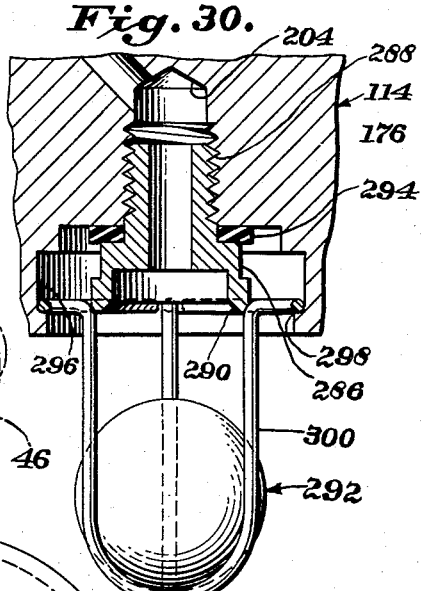
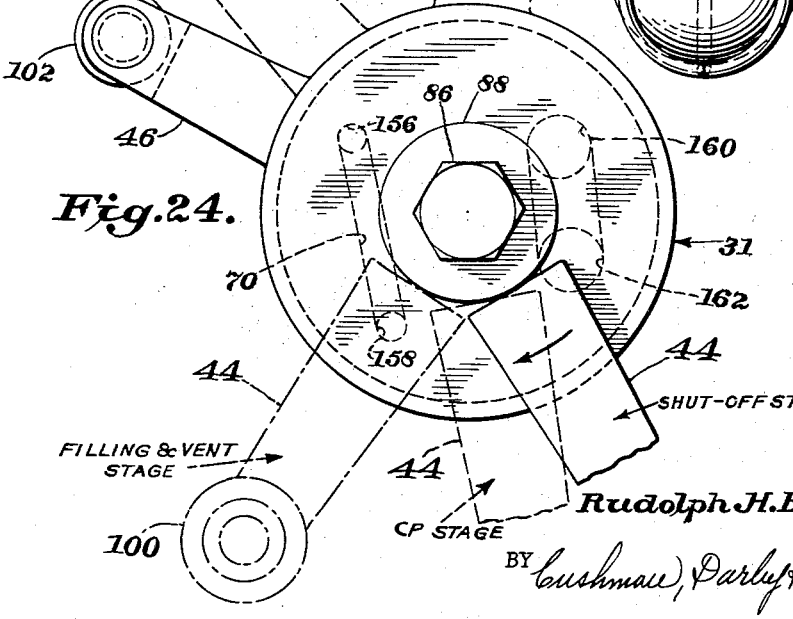
INVENTOR:
Rudolph H. Breeback,
BY Cushman, Darby & Cushman
ATTORNEYS.

Sept. 20, 1960  R. H. BREEBACK  2,953,169
FILLING MACHINE

Filed April 9, 1956  10 Sheets-Sheet 8

SHUT-OFF STAGE

FILLING AND VENT STAGE

COUNTER-PRESSURE STAGE

INVENTOR:
Rudolph H. Breeback
BY Cushman, Darby & Cushman
ATTORNEYS.

Sept. 20, 1960 R. H. BREEBACK 2,953,169
FILLING MACHINE
Filed April 9, 1956 10 Sheets-Sheet 9
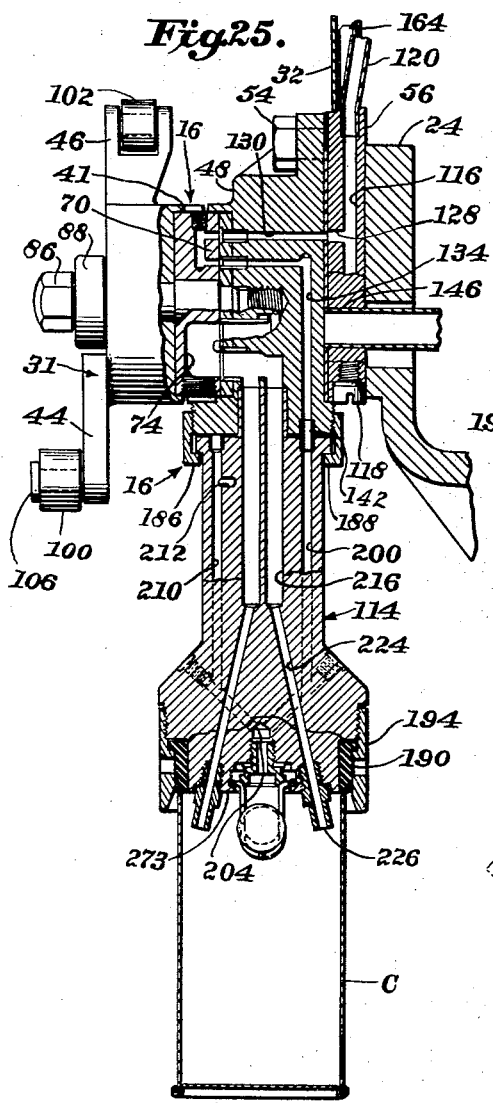
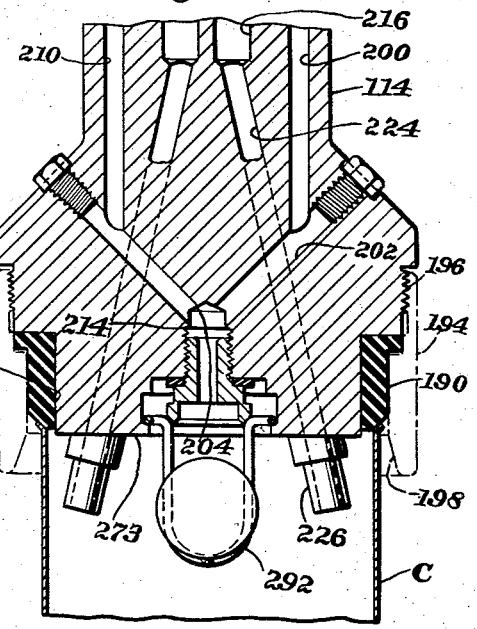
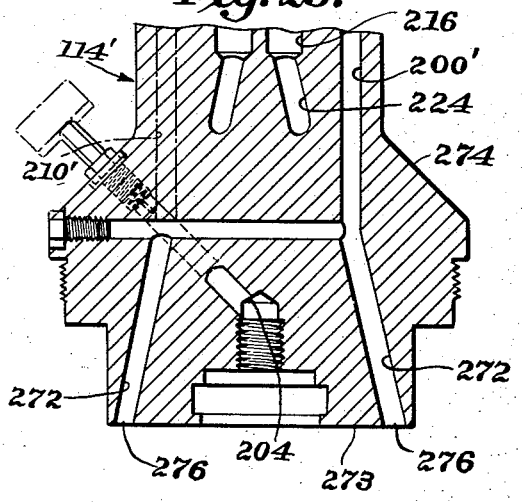
INVENTOR:
Rudolph H. Breeback,
BY Cushman, Darby & Cushman
ATTORNEYS.

Sept. 20, 1960  R. H. BREEBACK  2,953,169
FILLING MACHINE
Filed April 9, 1956  10 Sheets—Sheet 10
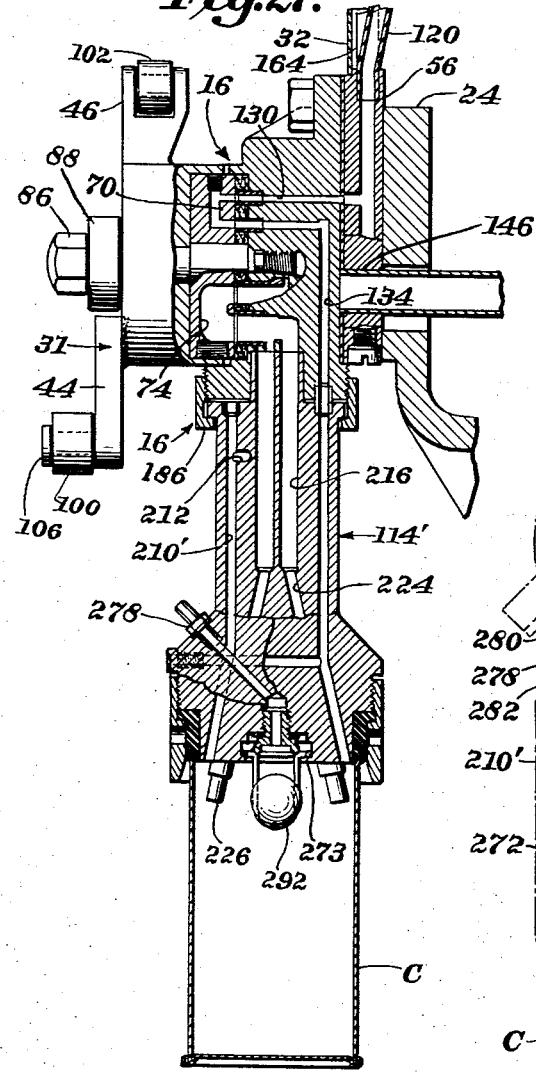
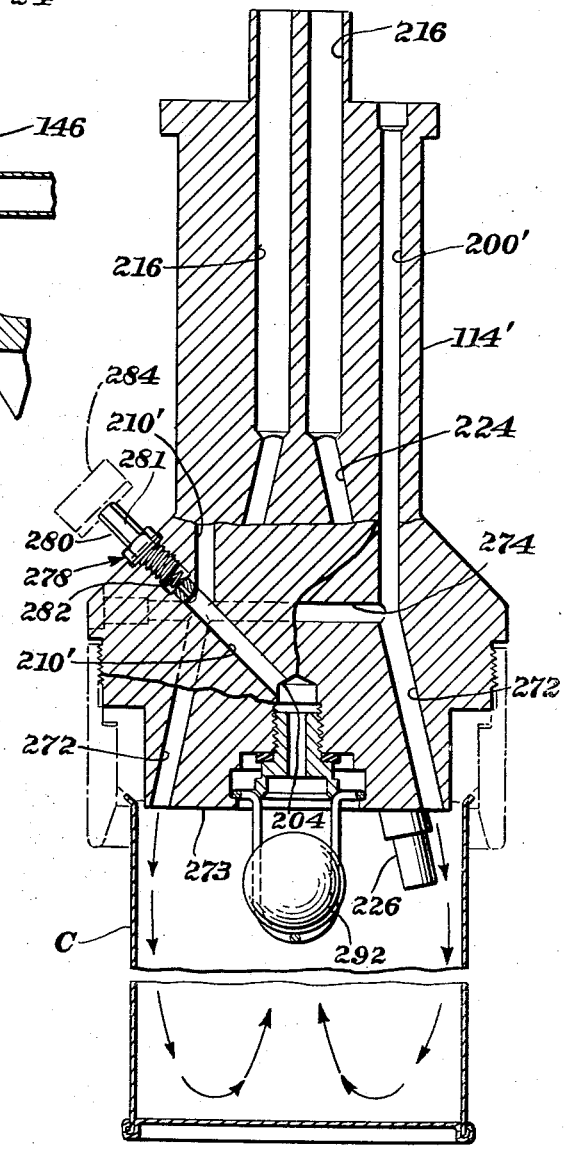
INVENTOR:
Rudolph H. Breeback,
BY Cushman, Darby & Cushman
ATTORNEYS.

United States Patent Office 2,953,169
Patented Sept. 20, 1960

2,953,169

FILLING MACHINE

Rudolph Henry Breeback, Baltimore, Md., assignor to Crown Cork & Seal Company, Inc., Baltimore, Md., a corporation of New York Filed Apr. 9, 1956, Ser. No. 576,891

53 Claims. (Cl. 141—6)

The present invention relates to a method and apparatus for filling containers with a liquid, and, more particularly, to a method and apparatus for controlling the quality of a carbonated liquid being filled into a container and increasing the speed of filling a container with a carbonated liquid.

The carbonated liquid is hereinafter referred to in the specification as beer. However, it is to be understood that any carbonated liquid may be used in the practice of the described method and in the use of the described apparatus.

In modern day breweries and other carbonated beverage plants, every effort is made to produce a beverage which meets the high standards required by the consumer and by public health regulations where applicable. In prior methods and apparatus for filling containers with a carbonated beverage, efforts were made to fill containers as rapidly as possible and to close the containers so that the beverage flowed into the container would not be contaminated. In other words, the practice was to transfer the carbonated liquid from the reservoir of the filling machine to the container as rapidly as possible so that liquid was not in contact with shop air any longer than necessary. However, the majority of apparatus for filling containers with carbonated beverages did not obviate the problem of shop air coming into contact with the beverage while the container is being filled. Normally, a counterpressure is established in the container by placing the container in communication with the superposed body of gas above the liquid in the filling machine reservoir. During the filling cycle, the counterpressure gas which would normally come into contact with the shop air which is in the empty container, was vented back to the reservoir. Eventually, the shop air would build up in the gas above the liquid in the reservoir, resulting in a mixture of air and gas which would have harmful effects on the liquid in the reservoir. Further, no means were provided on prior apparatus to purge the container by removing the shop air therefrom prior to the establishment of counterpressure therein and the completion of the filling cycle.

An object of the present invention is to provide a method and apparatus which will fill containers with a carbonated liquid such as beer, the quality of the liquid being unimpaired throughout the filling cycle.

Another object of the present invention is the provision of a method and apparatus wherein the carbonated liquid is flowed into containers which are purged of shop air prior to the establishment of counterpressure in the containers.

Still another object of the present invention is the provision of an improved method and apparatus for filling containers with a carbonated liquid, the method and apparatus contemplating the elimination or purging of shop air from the container prior to the establishment of a counterpressure gas in the container and, further, the venting of counter-pressure gas from the container during filling to a chamber other than the gas and liquid reservoir.

A still further object of the present invention is to provide a method and apparatus for filling containers with a carbonated liquid, the carbonated liquid never coming into contact with shop air and, further, the containers being accurately filled to a predetermined height.

Still another object of the present invention is to provide a filling machine utilizing a reservoir for a liquid and a superposed body of gas and a second reservoir for gas under pressure, the gas vented from the container during filling being vented to the second reservoir.

Ancillary to the preceding object, it is an object of the present invention to maintain a substantially constant pressure differential between the superposed body of gas in the gas and liquid reservoir and the gas in the second reservoir to thereby guide a definite flow rate condition and accurate level control.

In the filling of containers with a carbonated liquid such as beer, experience has shown that the carbonated liquid cannot have extreme velocity conditions when flowing from the filling head into the container; otherwise, the carbonated liquid will not be in a stable state when the flow of liquid is suddenly stopped. High terminal velocities in the flow of carbonated liquid, when suddenly shut off, result in a suction on the liquid remaining in the liquid passages leading to the outlet ports and this suction pulls the "prime" from the passages into the container. It is undesirable to pull the prime from the liquid passages as no definite quantity can be taken from the passages each time, and hence, inaccurate filling conditions occur during filling of successive containers. Two factors are involved in maintaining the proper prime in the liquid passages of a filling head, the first being the diameter of the liquid passage and the second being the capillarity or cohesion of the liquid to the walls of the liquid passage. Both factors are coupled together in that if the diameter of the liquid passage is too great, the terminal velocity and weight of the liquid will overcome the capillary attraction of the liquid to the walls of the liquid passage, causing the liquid remaining in the passages to flow therefrom when liquid flow is shut off.

An object of the present invention is to provide a filling head having a liquid passage arrangement wherein a maximum volume of liquid is flowed into the containers without the terminal velocity of the liquid affecting the prime which is desired to be maintained in the liquid passage after the liquid is shut off.

Still another object of the present invention is to provide a filling head wherein a maximum volume of liquid is flowed into a container without the stability of the liquid being affected.

A further object of the present invention is to provide a filling head which has a liquid passage therein subdivided into a number of liquid passages so as not to affect the discharge condition of liquid when it is desired to fill at a maximum volume rate.

In the filling of containers with carbonated liquids, it is desirable to so handle the filling operation that the height of filling can be accurately and uniformly controlled. Heretofore, it has been proposed to control the height of filling by means of a ball float valve adapted to close the vent passage by rise of liquid in the container to a predetermined height, thereby closing off the flow of liquid into the container. In filling containers with certain liquids such as beer, the foam and the force of beer flowing into the container would often cause the float valve to have a bobbing effect, resulting in premature closing of the vent passage. The bobbing of the float valve is objectionable, especially where the float valve is a hollow ball made of two semi-spherical sections seamed together. Often the seam would seat against the valve seat surface and, thus, preventing sealing of the vent and, consequently, overfilling of the container.

An object of the present invention is to provide a filling head with an improved hollow ball-type float valve which orients itself as liquid flows into the container so that it always properly seats when liquid reaches a predetermined height in the container.

Still another object of the present invention is to provide a filling head with a float valve, the float valve being of the hollow ball type, made of two semi-spherical sections seamed together. The float valve is so designed that it floats in the liquid with the seam at the liquid line.

A still further object of the present invention is to provide a ball float valve for use with filling heads which is made of a synthetic resin and is self-orienting.

In filling heads of the type having a liquid passage therethrough which change direction either due to position of the filling valve with respect to the filling head or with respect to the filling nozzle, it has been disadvantageous to flow carbonated liquid rapidly, as turbulence occurs where the direction of the flow line is abruptly changed. Turbulence in the flow of carbonated liquid releases the gas in the liquid and, thus, causing foaming and inaccurate filling of the container.

Another object of the present invention is to provide a filling head having liquid passages therein, the liquid passages being so streamlined that turbulence of the liquid caused by changing the direction of flow of the liquid is obviated.

In the conventional filling valve of the disk type used in filling heads of rotary filling machines, the operating arms of the valve disk are adapted to contact stationary cams on the filling machine frame as the filling head rotates with the rotary reservoir. The contact of the stationary cams with the arm has a tendency to raise the valve disk from the seat in the valve body, thus, causing momentary leaks in the valve which, at shut-off, is objectionable in that the prime is dropped out of its liquid passage into the container.

An object of the present invention is to provide an improved disk type of filling valve for a filling head, the arrangement of the valve operating arms being such that they cause no rocking action on the valve disk body and, thus, the valve disk body will maintain, at all times, its proper sealing relationship with the valve seat on the filling head body.

Still another object of the present invention is to provide a filling head having a filling valve therein wherein the pressure with which the movable valve element seats against the valve seat is evenly distributed on the valve seat.

On rotary filling machines, striker arms are usually provided for operating the filling valve, as the filling head is carried by the rotating reservoir past fixed cams on the stationary frame of the machine. The conventional striker arms have a sliding action with stationary cams on the filling machine frame. After continued use, the arms have to be replaced because wear at the contact surface with the cams would affect the opening and closing of the valve and thus disturb the filling cycle.

An object of the present invention is to provide a filling head with a filling valve having striker arms thereon, the striker arms being provided with a rolling contact for engaging the cam and thereby eliminating friction and wear on the striker arms.

These and other objects of the invention will be discussed more fully in the following specification, claims, and drawings in which:

Figure 1 is a fragmentary cross-sectional view partly in elevation of the upper portion of a rotary filling machine of the present invention;

Figure 2 is a front elevational view of the filling head of the present invention, the filling nozzle portion of the filling head being omitted for purposes of clarity;

Figure 3 is a sectional view taken on the line 3—3 of Figure 2 and showing details of the disk valve operating member arrangement;

Figure 4 is a rear elevational view of the disk valve operating member of Figures 2 and 3;

Figure 5 is a sectional view taken on the line 5—5 of Figure 4;

Figure 6 is a front elevational view of the disk valve element of the filling head of Figure 3;

Figure 7 is a cross-sectional view of the disk valve element taken on the line 7—7 of Figure 6;

Figure 8 is a sectional view taken on the line 8—8 of Figure 6 and showing the liquid passage through the disk valve element;

Figure 9 is a sectional view taken on the line 9—9 of Figure 6 and showing the gas passage of the disk valve element;

Figure 10 is a front elevational view of the filling head body element and showing the filling valve seat face, the filling nozzle being omitted for purposes of clarity;

Figure 11 is a sectional view taken on the line 11—11 of Figure 10;

Figure 12 is a sectional view taken on the line 12—12 of Figure 10;

Figure 13 is a sectional view taken on the line 13—13 of Figure 10;

Figure 14 is a fragmentary sectional view taken on the line 14—14 of Figure 12;

Figure 15 is a bottom plan view of the filling head body element of Figure 10;

Figure 20 is a vertical sectional view of the filling nozzle taken on the line 20—20 of Figure 17;

Figure 24 is a schematic view of the disk valve, the valve operating arms being shown in their relative positions for the various stages of a filling cycle;

Figure 25 is a diagrammatic sectional view taken on several vertical planes of the filling head illustrating a number of the fluid flow pasages through the filling head, the filling valve being in the neutral or closed position;

Figure 26 is an enlarged fragmentary sectional view of the filling nozzle of the filling head disclosed in Figure 25, the view being taken on several vertical planes and showing the counterpressure, vent and liquid passages;

Figure 27 is a diagrammatic sectional view taken on several vertical planes of a modified form of filling head illustrating a number of the fluid flow passages through the filling head and disclosing the purge valve;

Figure 28 is an enlarged sectional view of the filling nozzle of the filling head shown in Figure 27, the view being taken on several vertical planes;

Figures 29 is a fragmentary view of the filling nozzle shown in Figure 28 but taken on a different vertical plane;

Figure 30 is an enlarged vertical sectional view of the float valve arrangement including its mounting on the filling nozzle; and Figure 31 is a vertical sectional view through the ball float valve disclosed in Figure 30.

GENERAL ARRANGEMENT AND OPERATION OF THE FILLING MACHINE

Figure 17:
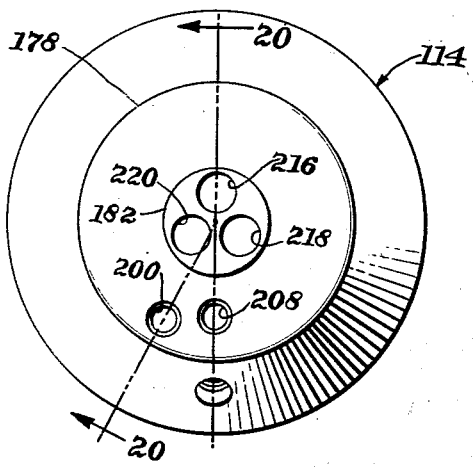
Figure 17 is a top plan view of the filling nozzle of Figure 16.

The general arrangement of the filling machine of the present invention may be best described by referring specifically to Figure 1 of the drawings which shows the upper portion of the filling machine embodying the invention.

In more detail, the filling machine is of the rotary type which includes a stationary base and a bearing post, not shown, on which a hollow column or sleeve 10 is rotatably mounted. The arrangement of the base and bearing post as well as the stationary frame of the filling machine may be of the general type shown in the United States patents to Robert J. Stewart and Wiltie I. Gladfelter, Nos. 2,097,107 and 2,202,033, for Filling Machine, issued October 26, 1937 and May 28, 1940, respectively. The sleeve 10 carries a filling table 12 having a plurality of vertically movable container supporting platforms 14 mounted on its periphery. Containers are successively fed along a stationary work table, not shown, and transferred therefrom onto container supporting platforms 14 as the platforms pass the infeed station of the filling machine. Column 10 and table 12 are rotated about the bearing post by any suitable source of power such as a motor, and suitable means including cams are provided on the stationary frame of the filling machine for causing the container supporting platforms 14 to be moved vertically upwardly and downwardly. A filling head generally indicated at 16 is provided above each of the container supporting platforms 14 and, after the container supporting platforms receive a container at the infeed station, the container is brought into sealing engagement with the filling head. In a filling cycle occurring in the travel of a container about the filling machine, counterpressure is first established in the container, the liquid is then flowed into the container simultaneously while the gas is being vented therefrom, and finally the container is lowered from the filling head and transferred from the filling machine for closing.

The upper end of column or sleeve 10 supports a tubular member generally designated 20 which is provided with a horizontally outwardly extending apron or flange 22, the flange being upturned at its outer edge to provide a circumferential shoulder 24. A filling reservoir generally designated 18 is supported on the upper surface of the flange or apron 22 by any suitable means such as the bolts 26. Filling reservoir 18 contains a carbonated liquid such as beer and a superposed body of gas, suitable piping being provided between filling head 16 and the reservoir, as will be described in more detail later in the specification. The filling heads 16 are secured to the shoulder 24 in the usual manner and in vertical alignment with the respective container supporting platform 14.

Flange or apron 22 also supports a plurality of vertical standards 28 adjacent its periphery and inwardly of the shoulder 24. Standards 28 support a doughnut-shaped pressure tight collector ring or second reservoir 30, the purpose of the reservoir 30 being discussed in full later in the specification. A suitable skirt 32 extends between the outer edge of the doughnut-shaped reservoir 30 and the shoulder 24 to enclose piping extending between the filling heads and the reservoirs 18 and 30 respectively. A further skirt 34 extending between the inner edge of reservoir 30 and the top portion of reservoir 18 is provided to cover the aforementioned piping so that the entire upper portion of the filling machine is enclosed.

Assuming that the filling machine is to be used to fill containers such as the cans C with beer, the beer is delivered to the lower portion of reservoir 18 from a government vat, the beer entering the lower portion of the reservoir by a pipe 36 extending axially upwardly through the column 10. A suitable seal is provided between the upper end of pipe 36 and the bottom of reservoir 18. Beer is maintained in the reservoir at a predetermined level and under a suitable predetermined pressure of gas, the gas usually being carbon dioxide. The carbon dioxide gas may be delivered to reservoir 18 from a suitable pressure source to the upper portion of reservoir 18 by a hose, not shown, connected to a suitable adapter 38. Adapter or sleeve 38 rotates with reservoir 18 and is provided with suitable means for a rotating sealing connection with the hose leading from the carbon dioxide pressure source.

A pressure regulator generally designated 40 and including a gauge element is provided on the top of reservoir 18 for releasing gas pressure which may build up in the reservoir above predetermined limits. Suitable means, such as a float valve control of the type disclosed in United States Patent No. 2,097,107, issued October 26, 1937, to Robert J. Stewart and Wiltie I. Gladfelter, may be utilized to control the inflow of beer from the government vat or storage tank.

Each filling head 16 is provided with a disk type filling valve generally designated 31 and including a valve operating member 42 having striker arms 44 and 46 thereon extending radially of the valve axis as well as a disk valve element 41. Cams mounted on the stationary frame of the filling machine surrounding the rotary parts including the filling table 12 and reservoir 18 are adapted to be in the path of and engage the striker arms 44 and 46 to rotate the disk type filling valve 31 to align passages therein and thereby complete the various stages of the filling cycle. In other words, after a container has been placed on the moving container supporting platform 14 and raised vertically into sealing engagement with filling head 16, a first stationary cam in the path of valve operating member 42 engages the striker arm 44 to move the valve 31 to a position where counterpressure gas is flowed from above the liquid in reservoir 18 to the container. Continued movement of the filling table and reservoir 18 will carry the filling head to a position where the striker arm 44 engages a second stationary cam which moves the valve 31 to a second position where the container is filled with beer from reservoir 18 and gas in the container is vented. Subsequent travel of the filling head in its rotary path will cause the striker arm 46 to hit a third stationary cam, the third cam returning the valve to the closed position, after which time the container is lowered away from the filling head and is transferred from the filling table to suitable closing mechanism.

The above description of the arrangement and operation of the filling machine will assist in the understanding of the invention as disclosed in detail under the headings: Filling Valve Construction; Filling Head with Multi-Stage Liquid Passages; Separate Vent and Counterpressure Filling Machine; Container Purging Prior to Filling; and Ball Float Valve Construction.

Filling valve construction

Referring now specifically to Figures 2 through 7 inclusive, filling head 16 of the present invention includes a filling head body element 48 having a flanged portion 50 which is provided with a bolt hole 52 and the arcuate bolt holes 52'. The filling head body element 48 is attached to a mounting plate 56 by means of bolts 54. The mounting plate 56 in turn is secured to the peripheral flange or shoulder 24 of the apron 22 in any suitable manner such as by bolts or the like. Mounting plate 56, as best shown in Figure 25, is provided with gas and liquid passages which are connected to gas and liquid conduits or tubes extending from gas and liquid reservoir 18, and gas reservoir 30, as will be explained in more detail later in the specification.

The outer surface of body element 48 opposite its flanged portion 50 is provided with a shallow circular recess 58 in which a gasket 60 is positioned. Gasket 60 is provided with suitable apertures which align with gas and liquid passages in the body element 48 opening to the recess 58. The outer surface of the gasket may be treated to provide a smooth flat planar sealing surface for cooperating with disk valve 31 and, thus, the gasket 60 is the planar valve seat face of body element 48.

A shaft or spindle 62 is fixed to and extends outwardly from body element 48 axially of the body element's planar seat face, as defined by the gasket 60. Body element 48 is provided with a bore 64 therethrough, the bore having a portion thereof intermediate its ends threaded as indicated at 66. Threads 65 are provided on each end of shaft 62, the threads at one end being of reduced diameter than the threads on the other end. Intermediate the ends of shaft 62, a third thread 63 is provided, this thread being of greater diameter than the thread 65 of reduced diameter. The end of the shaft having the thread of reduced diameter is inserted through the bore 64 from the front of body element 48 toward its rear flanged portion 50, the threads 63 cooperating with the threads 66 to properly position the shaft with respect to the body element 48 and its seat face defined by gasket 60. A nut 68 is threaded onto the reduced threaded end 65 of the shaft which extends through rear portion body element 48, the nut 68 firmly locking the shaft 62 in position and preventing its rotation with respect to body element 48.

Cooperating with the planar seat fact of gasket 60 of body element 48 is a disk valve element 41 which is rotatably mounted on the stationary shaft 62. Disk valve element 41 is provided with a gas passage 70 and a liquid passage 74, the gas and liquid passages being adapted to align with gas and liquid passages in the body element 48 when disk valve 41 is rotated for the various stages of a filling cycle discussed later in detail.

Disk valve element 41 which has a diameter substantially equal to the diameter of the recess 58 in body element 48 is cylindrically shaped. One of its planar surfaces 76 is adapted to cooperate with the planar seat face of gasket 60 of body element 48. The usual practice is to lap surface 76 so as to provide a tight sealing engagement with the planar seat face of gasket 60 and, thus, prevent gas and liquid leakage radially thereof when the disk valve element 41 is rotated with respect to the body element.

As previously mentioned, rotary filling machines are provided with radially extending valve operating arms usually made integral with the disk valve element. However, this arrangement has proved unsatisfactory in service where the filling valve is operating on a filling machine having a pressurized system. The engagement of the valve operating arms with stationary cams resulted, after continued use, in a slight rocking movement of the disk valve element and the rocking movement on a radial plane resulted in the valve element raising from its seat face, causing leaking of gas or liquid. This condition resulted in unsatisfactory operation of the filling valve in that it interefered with the flow conditions for which the valve was designed, causing inaccurate filling of the containers. Further, leaking of beer around the filling valve created an unsanitary as well as unsightly condition.

To obviate the above disadvantages of prior disk-type filling valves, a valve operating member 42 is also rotatably mounted on shaft 62 and is keyed to the disk valve element 41 so that there is a rotary driving connection between the disk valve element and the valve operating member. Rocking movement of the valve operating member is not transferred to the disk valve element to thereby disturb its fluid tight seating engagement with the planar seat face of gasket 60 of body element 48. In more detail, and referring specifically to Figures 4, 5, 6 and 7, the outer surface of cylindrically shaped valve element 41 is provided with a split collar 78, the split portion of the collar defining a keyway 80. Valve operating member 42, which is cylindrically shaped, is recessed at 82 and is adapted to be rotatably mounted on the shaft 62 with a portion of the valve element 41 enclosed or telescoped in its recess. Radially extending lugs 84 are provided in the recess 82 of valve operating member 42 adjacent its axis, the lugs 84 being complementary to and received in the keyway 80 of the split collar 78. As is now evident, driving connection between the valve operating member 42 and the disk valve element 41 is through the lugs 84 and the split collar 78 integrally mounted on valve element 41.

Valve operating member 42, as well as disk valve element 41, is retained on the shaft 62 by means of a nut 86 threaded onto the end 65 of the shaft extending through the valve operating member. A thrust bearing 88 may be positioned between the nut 86 and the valve operating member 42 so that the valve operating member is firmly secured on but still rotatable with respect to the shaft 62. Suitable bearing means such as the roller bearings 90 are provided between the shaft and the valve operating member 42.

As clearly shown in Figures 2 and 3, valve operating arms 44 and 46 extend radially of the valve operating member 42 and are integrally connected thereto in a suitable manner such as welding, as indicated at 92. The angle with which the arms 44 and 46 are positioned with respect to valve operating member 42 and disk valve element 41 depend upon the filling cycle of the filling machine.

In order that the seating surface 76 of disk valve element 41 will bear against the planar seat face of gasket 60 with an evenly distributed pressure, resilient means including a plurality of coil compression springs 94 are interposed between the valve operating member and the disk valve element. In more detail, the body of the valve operating member 42 is provided with a plurality of counterbores 96 closed at their inner ends, as indicated at 98 and opening to the recess 82. The axis of each bore 96 is parallel to the axis of rotation of the valve operating member and normal to the seating surface 76 of disk valve element 41. The counterbores 96 may be three in number spaced 120° apart, as shown in Figure 2; however, there may be any number of springs so long as they are equally spaced from each other and from the axis of rotation of the valve operating member. One end of the coil springs 94 is positioned and retained in the counterbores 96 bearing against their bottoms or closed ends 98. The other ends of the coil springs bear against the outer surface of the valve element 41. Because there is no rotational movement between valve operating member 42 and disk valve element 41 due to the driving connection therebetween, the counterbores 96 are sufficient to retain the springs in place.

In summation of the above, it is now evident that when a stationary cam in the path of the filling head strikes one of the valve operating arms 44 or 46, it rotates the valve operating member 42 on the shaft 62. Because the valve operating member 42 is keyed directly to the disk valve element 41, the disk valve element will also rotate. However, the valve operating member 42 may move axially of the disk valve element 41 or it may rock in a plane radial to the axis of rotation of the disk valve element and still not affect the sealing efficiency of the disk valve element with respect to the planar seat face of gasket 60. The coil springs 94 will exert an even pressure on disk valve element 41 and will compensate for any axial or rocking movement of the valve operating member 42.

Referring now to Figures 4 and 5, it will be noted that the valve operating arms 44 and 46 are provided with rollers 100 and 102 respectively on their outer ends. Roller 100 is mounted for rotation on a stud 104 extending outwardly of the arm 44. Suitable retaining means, such as the washer and rivet arrangement indicated at 106, retain roller 100 on stud 104. Arm 46 is bifurcated at its upper end, as indicated at 110, and roller 102 is mounted in the bifurcated end of arm 46 on a stud 112 having its outer ends peened aganst the outer surfaces of the bifurcated portion of the arm.

The rollers are made of a hardened steel so as to prevent wear. By providing rollers on the filling valve operating arms, the sliding action of the arms with the stationary cam is eliminated and replaced by a roller action. Since the stationary part, which in this instance would be the stationary cam, would wear more rapidly, the provision of rollers on the valve operating arms eliminates replacement of valve arms. In present day filling machines where there are from forty to sixty filling heads on each machine, the use of rollers on the valve operating arms materially decreases maintenance on the machine, as it is much easier and less expensive to replace, for example, three stationary cams than forty to sixty valve arms. In addition, it is advantageous to have rollers on the valve operating arms, as uniform flow conditions will exist in all filling heads of the filling machines because the wear, if any, on the rollers will be substantially identical.

*Filling head with multi-stage liquid passages*

Many factors are involved in obtaining maximum output of filled containers per minute from a rotary filling machine when the liquid involved is carbonated. Under the practice now followed, counterpressure is established in the containers as fast as possible so that the counterpressure stage does not utilize too much of the travel space about the rotary path of the filling head. Fast counterpressuring of the container leaves a maximum travel space of the filling head for the filling or liquid flow stage and, thus, the rate of flow of liquid does not have to be too fast. Because of the fact that a carbonated liquid such as beer cannot be flowed too rapidly into a container, it is not possible to increase the speed of rotation of the filling table by too great an extent to increase the output of filled bottles. The usual procedure in the past to speed up production was to increase the number of filling heads and platforms upon the filling machine. Such increase in the size of or the number of filling heads and platforms on the filling machine increases the cost of the filling machine. The size of the filling machines is also limited by the fact that maintenance and operating problems are introduced such as vibration and wear on the bearings of the machine.

Increasing the output of a filling machine by increasing the flow rate of beer into the containers has not proved satisfactory because high terminal velocities of beer entering the container result in foaming. Increasing the size or diameter of the liquid passages to increase the volume of flow into the container at slower terminal speeds has proved unsatisfactory because a prime could not be maintained in the liquid passages after the filling valve was shut off. Failure to maintain an accurate volume of prime in the liquid passages causes inaccurate flow conditions, resulting in inaccurate filling levels in successively filled containers. In other words, to obtain the proper flow characteristics of liquid in a filling valve, the liquid passage cannot be too small in diameter, as the terminal speed to obtain a desired flow volume is too fast to retain a prime and, in addition, will pull or suck the prime from the liquid passages. If the liquid passage is of too great a diameter, the weight of the liquid in the passage after shut-off overcomes the capillarity of the liquid to the walls of the liquid passages and flows into the containers. The present invention contemplates utilization of a liquid flow passage having an optimum diameter for retaining the prime therein at maximum volume output, the terminal velocity of liquid being such as not to cause foaming in the container.

Another factor involved in maintaining a prime in liquid passages after liquid flow is shut off is the capillarity or adhesion of the liquid to the walls of the liquid passages. Normally the molecules of the liquid have an attraction for each other, this being a case of cohesion. However, the molecules of the liquid also have an attraction for the walls of the liquid passage to a certain extent, this being a case of adhesion or capillarity. The wetting characteristics of the surface of the walls of the liquid passages determines the amount of adhesion or capillarity of the liquid to the walls. Therefore, to increase the capillarity and prevent the cohesive forces of the molecules from pulling the liquid away from the walls of the liquid passages, the wetting characteristics must be increased to a point where the adhesive forces are greater than or overcome the cohesive forces. In the present invention, the liquid passages in the filling head extending from their outlet back to the filling valve have their wall surfaces made of brass. Brass has a greater wetting characteristic than steel and, by use of brass for the surface of the walls of the liquid passages, the capillary attraction of the liquid to the walls is increased. Consequently, larger diameter terminal liquid passages can be used for a given terminal velocity of liquid flowing into a container, the prime in the passages after liquid flow is shut off being maintained. The lower portion of the filling head can be made of brass or, if desired, brass sleeves can be inserted into the liquid passages of the usual filling head to provide a wall surface of brass.

Referring now to Figures 1, 16 through 20 inclusive, and 25, it will be noted that the filling head 16 of the present invention is provided with a downwardly depending filling nozzle generally designated as 114. As will be explained in more detail later in the specification, the filling nozzle 114 contains liquid and gas passages cooperating with the liquid and gas passages in the upper portion or body element 48 of the filling head 16.

Referring now to Figures 1 and 25, it will be noted that mounting plate 56 is provided with a vertical gas passage 116 closed at its lower end by means of a plug 118. The upper end of gas passage or bore 116 is counterbored to receive a gas tube 120, the other end of the tube 120 extending into the upper gas containing portion of gas and liquid reservoir 18, as indicated at 122 in Figure 1. An annular baffle 124 with small apertures 126 prevents foam in reservoir 18 from blocking the portion of the reservoir where gas tube 120 enters.

A passage 128 in the mounting plate 56 extending from vertical bore 116 communicates with a gas passage 130 in body element 48. The other end of gas passage 130 opens to the planar seat face of gasket 60 as indicated at 132 in Figures 3, 10 and 11.

A second gas passage 134 is provided in body element 48, as best shown in Figure 10, the passage 134 opening to the planar seat face of gasket 60, as indicated at 136. Passage 134 extends downwardly through body element 48 and terminates on its lower substantially horizontal face 138, as indicated at 140. A tubular sleeve 142 is inserted into the lower end 140 of passage 134, the purpose of the sleeve being to align passage 134 with a gas passage in filling nozzle 114.

A liquid tube 144 extending from the lower liquid containing portion of gas and liquid reservoir 18 is received in a bore 146 in mounting plate 56 and communicates with a liquid passage 148 in body element member 48. The other end of liquid passage 148 communicates with the planar seat face of gasket 60 of body element 48, as indicated at 150 in Figure 12.

A second liquid passage 152 opens to the planar seat face 60, as indicated at 154 in Figures 3, 10, 11, 12 and 13. Liquid passage 152 extends downwardly through body element 48 and terminates on its lower horizontal surface 138 as indicated at 155.

Referring now to Figures 6, 8 and 9 and, as mentioned above, the rotatable disk valve element 41 is provided with the gas passage 70 and the liquid passage 74. Gas passage 70 opens to the seating surface of disk valve element 41, as shown at ports 156 and 158 in Figure 9. Liquid passage 74 of the valve element 41 also opens to the seating surface 76 at ports 160 and 162 indicated in Figure 8.

A vent tube 164 extends downwardly from the upper portion of the gas reservoir 30 and is connected to a bore or vent passage (not shown) in the mounting plate which is positioned directly behind the gas passage 116 shown in Figure 25. The vent passage in the mounting plate communicates with a vent passage 166 in the body element 48, as best shown in Figure 10. Vent passage 166 in body element 48 opens to the planar seat face of gaskets 60 as indicated at 168. A second vent passage 170 opens to the planar seat face of gaskets 60 of body element 48 at 172 and extends downwardly therefrom directly behind the gas passage 134, as viewed in Figure 10. The lower end of vent passage 170 terminates on the lower horizontal face 138 of body element 48 as indicated at 174 in Figure 15. A tubular sleeve 175 (Figure 15) is provided in the lower end of vent passage 170, the tubular sleeve being similar in construction to the sleeve 142 in the lower end of gas passage 134, as shown in Figure 10.

Figure 22:
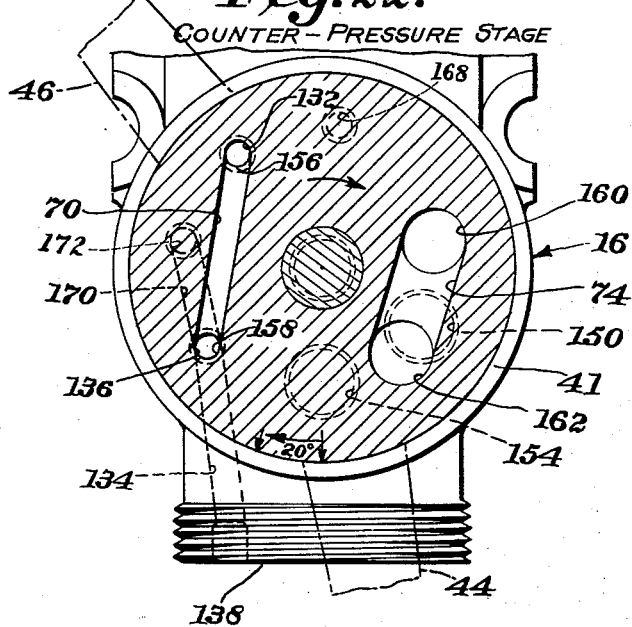
Figure 22 is a sectional view similar to that of Figure 21 but showing the disk valve rotated to the position it occupies for the counterpressure stage as well as the blow-out stage.

As best illustrated in Figures 21, 22, 23 and 24, disk valve element 41 is adapted to be rotated on a horizontal axis to align its gas and liquid passages 70 and 74 respectively with the gas, liquid and vent passages in the body element 48. In more detail, when the disk valve element 41 is in the position shown in Figure 21, the filling valve is in the shut-off stage in that the ports 156 and 158 of gas passage 70 and the ports 160 and 162 of liquid passage 74 are not in alignment with any of the ports in the planar face of gasket 60 of body element 48. In Figure 22 disk valve element 41 has rotated approximately 20° in a clockwise direction from its position shown in Figure 21 to a position where the ports 156 and 158 of its gas passage 70 are in alignment with the ports 132 and 136 respectively of the gas passages 130 and 134 of body element 48 respectively so that there can be a flow of gas from the upper gas containing portion of the gas and liquid reservoir 18 through the filling head to the container. As will be noted, when disk valve 41 is in the position shown in Figure 22, the ports 160 and 162 of its liquid passage 74 are not in alignment with the ports 150 and 154 of the liquid passages in body element 48. When the disk valve element is in the position shown in Figure 22, counterpressure is being established in the container prior to filling.

Figure 23:
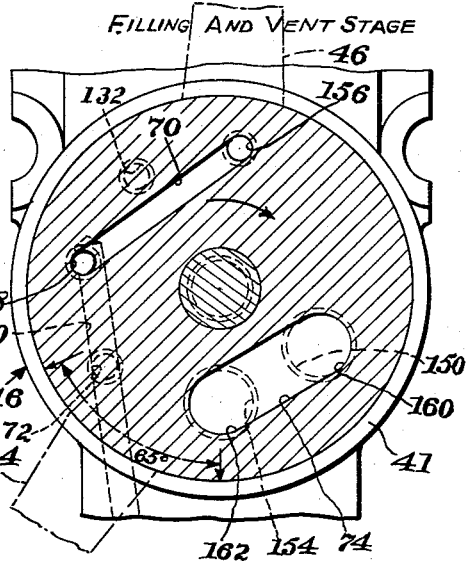
Figure 23 is a view similar to Figure 21 but showing the filling disk valve rotated to a position it occupies during filling and venting.

When the disk valve element is rotated to the position shown in Figure 23, the filling and vent stage occurs. In the filling and vent stage, the disk valve element 41 will have the ports 156 and 158 of its gas passage 70 in alignment with the ports 168 and 172 of the vent passages 166 and 170 respectively. The liquid passage in the disk valve element will be positioned so that its ports 160 and 162 are in alignment with the ports 150 and 154 respectively of the liquid passages 148 and 152. Liquid will flow through the liquid passages while counterpressure gas in the container is vented therefrom through the vent passages back to the second reservoir 30. A more detailed description of the separate vent and counterpressure feature of the present invention will be discussed more fully later in the specification under the heading "Separate Vent and Counterpressure Filling Machine."

As best shown in Figures 16 through 20, the filling nozzle 114 is detachably connected to the lower horizontal face 138 of body element 48. In more detail, filling nozzle 114 includes a body element 176 having an annular radially extending collar 178 at its upper end and a substantially horizontal face 180 at its lower end. Extending centrally of the body element 176 is an end portion 182 circular in cross-section and of a diameter to fit the vertical portion of liquid passage 152. Suitable threads 184 are provided on the lower end of body element 48, as shown in Figure 10 and when nozzle 114 is attached to the body element, the end portion 182 telescopes into the vertical portion of the liquid tube 152. A ring nut 186 having an inwardly extending flanged lower end 188 is adapted to bear against the collar 178 and be threaded onto the threads 184, as best shown in Figure 25 to retain the nozzle on the body element. Suitable apertured gaskets are provided between the planar face 138 of body element 48 and the upper surface of the collar 178 of filling nozzle 114. An annular container engaging sealing ring 190 positioned around the lower portion 192 of filling nozzle 114 is retained thereon by a ring nut 194 threaded onto threads 196 provided on the lower end of the body element 176, as best shown in Figures 25 and 26. Ring nut 194 is internally beveled as indicated at 198 to aid in centering a container C as it is brought into engagement with the filling head and makes sealing engagement with the gasket or sealing ring 190.

As best shown in Figures 17, 20, 25 and 26, a gas passage 200 leading downwardly from the upper end of the filling nozzle 114 extends inwardly on an angle as indicated at 202 to a central port 204 in the bottom horizontal surface 180 of the filling nozzle 114. At the upper end of gas passage 200, an enlarged counterbore 206 is provided, the counterbore receiving the sleeve 142 positioned in the lower end of gas passage 134 of body element 48. By providing the tubular sleeve 142 in the body element 48, the filling nozzle 114 can always be properly aligned about its vertical axis with respect to the body element 48.

A vent passage 208 (Figure 17) extends downwardly behind the gas passage 200, as viewed in Figure 25, to a point where it can extend laterally across the body 176 of filling nozzle 114 to meet a vertical vent passage 210 at 212, as shown in Figure 25. The lower end of vertical vent passage 210 opens to the same central port 204 as gas passage 200, as indicated at 214, as shown in Figure 26. The upper end of vent passage 208 is counterbored and is adapted to receive the tubular sleeve 175 in the vent passage 170 when the nozzle 114 is attached to body element 48.

Figure 18:
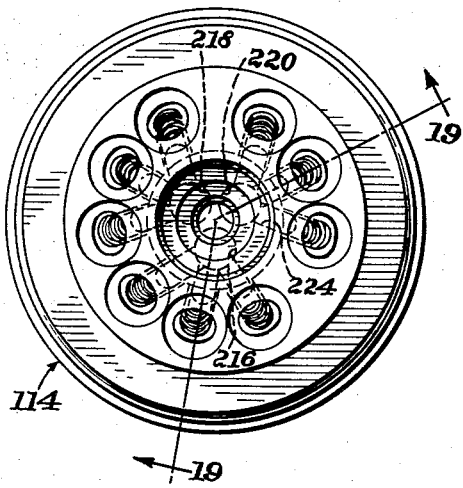
Figure 18 is a bottom plan view of the filling nozzle of Figure 16.
Figure 16:
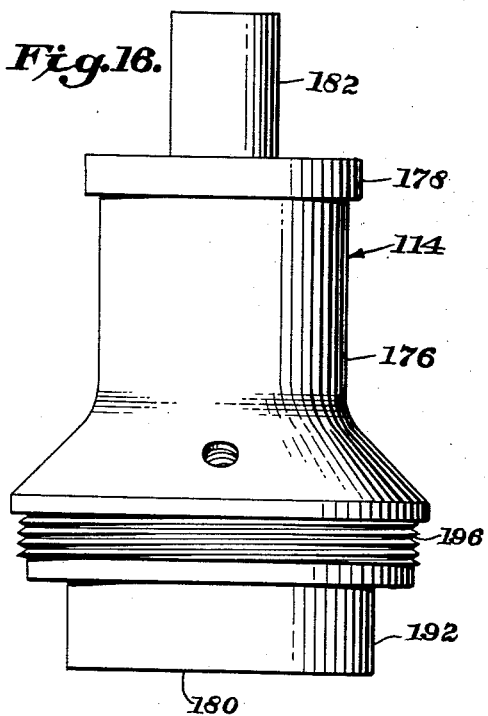
Figure 16 is an elevational view of the filling nozzle for use with the body element of the filling head disclosed in Figure 10.
Figure 19:
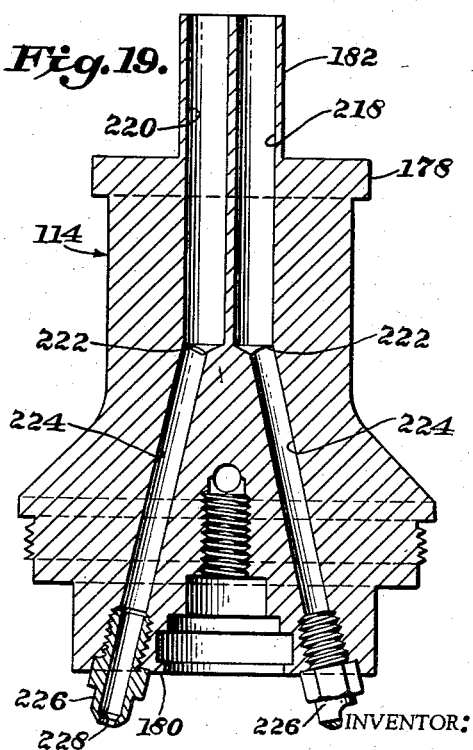
Figure 19 is a vertical sectional view of the filling nozzle taken on the line 19—19 of Figure 18.
Figure 21:
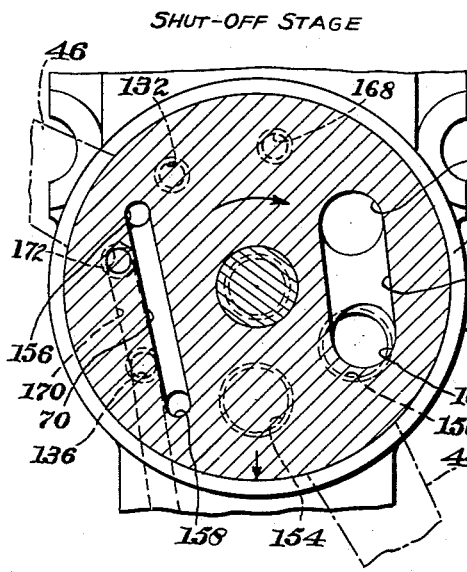
Figure 21 is a sectional view taken on the line 21—21 of Figure 3, and showing the filling disk valve in the neutral or closed stage.

The reduced end portion 182 of filling nozzle 114, which is adapted to telescope within the liquid passage 152 of body element 48, is provided with three vertically extending liquid passages 216, 218 and 220. The passages 216, 218 and 220 each terminate at a point 222, approximately midway of the length of the filling nozzle 114. At the point 222 each of the liquid passages 216, 218 and 220 are again subdivided into three liquid passages 224, which open to the bottom surface 180 of filling nozzle 114 about its periphery, as best shown in Figures 18 and 19. A tubular nozzle tip 226 having a reduced opening 228 at its lower end is threaded into each of the lower ends of liquid passages 224. As is now evident from Figures 10, 11, 18, 19 and 20, liquid flow through the filling head will be first through a single passage which is subdivided into three passages which in turn are each subdivided into three more passages so that there are nine outlets for liquid to flow into the container from the lower portion of the filling nozzle 114. As will be evident from the description given below relative to the sizes of the multi-stage liquid passages, a large volume of liquid can flow into the containers within a minimum time at a minimum terminal velocity rate for the flow of liquid.

Referring to Figures 12 and 13, it will be noted that the liquid passage 148 is of relatively large diameter so that a maximum volume of liquid can be flowed at a minimum velocity. If the diameter of passage 148 is in the order of 7/16 of an inch, then the diameter of the passage 152 communicating therewith through disk valve 41 and leading into the three liquid passages 216, 218 and 220 in the filling nozzle is also in the order of 7/16 of an inch. However, the liquid passages 216, 218 and 220 have a diameter equal to approximately 5/16 of an inch, whereas each of the liquid passages 224 have a diameter in the order of 3/16 of an inch, the tip nozzle openings 228 being in the order of .170 inch. By having the total inlet area of a liquid passage greater than the total outlet area when the passage is subdivided, a maximum quantity of liquid can be flowed into the container within a minimum time at a minimum of terminal velocity. Because the terminal velocity of the liquid is slow when leaving the nozzle tips 226, the prime is not sucked from the liquid passages 224 when liquid flow is shut off by the filling valve. Further, the effect of subdividing the liquid passages, as heretofore mentioned, results in a liquid flow into the container which is effectively the same as if there were a single large liquid passage without the disadvantages resulting in the use of a single large liquid passage.

As mentioned above, the passages 216, 218, 220 and 224 have brass surfaced walls, the use of brass increasing the wetting characteristics of the walls. By increasing the wetting characteristics of the walls of the liquid passages, the capillary attraction or adhesion of liquid to the walls is increased so that the liquid prime will remain in the passages when liquid flow is shut off. Accordingly, the use of brass, which increases the wetting characteristics as well as the capillarity, permits use of larger diameter liquid passages than heretofore possible.

Referring now to Figures 8, 12 and 13, it will be noted that the liquid passages through the body element 48 and the disk valve element 70 are rounded where the passages change direction. More specifically, the liquid passage 148 in body element 48 is rounded at 230 and 232 and the passage 152 is rounded at 234. Passage 74 in disk valve element 41 is rounded at 236 and again at 238 where the direction of flow of liquid is changed. By using round bottom drills to drill the liquid passages, the intersection of liquid passages is provided with a spherical radius. Of course, where the intersection is such as disclosed in Figure 8 at 238, a block of material 240 must be sweated into place after the passage 74 has been drilled. After the block 240, which is shown in the dotted line in Figure 8, has been sweated into place, the passage leading from the point 162 is drilled with a round bottom drill so as to give the rounded effect to the corner 238. The usual plug 242 is inserted into the end of passage 74 to close the same.

By having all of the bends or intersections of the liquid passages through the filling head rounded, a streamlined effect is developed and turbulence is reduced to a minimum. Further, the rounded intersections of the liquid passages eliminate pockets at the point of intersection and thereby permits easier cleaning and prevents carbonated beverages from collecting therein.

*Separate vent and counterpressure filling machine*

Figures 1, 25 and 26 show the arrangement of the separate vent and counterpressure filling machine of the present invention. The disk valve element 41 of filling head 16 will operate as previously mentioned for the shut-off stage, counterpressure stage and filling and vent stage in the filling cycle, as disclosed in Figures 21, 22 and 23, respectively.

Referring now to Figure 1, and as previously explained, the filling machine is provided with a separate reservoir or collector ring 30 which surrounds the main gas and liquid reservoir 18. A conduit or manifold 244 opens to the gas containing portion of reservoir 18, as indicated at 246. The other end of manifold 244 extends to a pressure control device generally designated 248. A second conduit 250 extends from reservoir 30, as indicated at 252, to the pressure control device 248. Pressure control device 248 includes a one-way check valve which will permit the flow of gas from the gas containing portion of reservoir 18 through the conduits 244 and 250 to the reservoir 30 upon conditions mentioned below, but will not permit the reverse flow of gas from the reservoir 30 to the gas and liquid reservoir. Pressure control device 248 is further provided with a diaphragm having one side exposed just to the pressure in reservoir 30 through the conduit 250 and the other side operatively connected to the pressure relief valve for the gas and liquid reservoir 18. The diaphragm is suitably loaded on its side exposed to the pressure in the reservoir 30 so that a pressure differential between the reservoirs can be maintained. The loading may be adjusted to vary the pressure differential, if desired.

As clearly shown in Figure 1, reservoir 30 is provided with a cover 254 which is held in place by the retaining bolts 256. Suitable gaskets 258 are provided between the cover 254 and the walls of the reservoir 30 to make the seal of the cover with the reservoir air-tight. A drain hole 260 is provided at the bottom of the sloping bottom walls 262 of the reservoir, the hole 260 being provided with a valve seat 264 which receives a float valve 266. If any liquid gets into reservoir 30 through the vent line 164, the float valve 266 will rise and let the liquid drain therefrom through the drain hole 260. When there is no liquid in the reservoir 30, the float valve forms an air-tight seal against the valve seat 264 so that there can be no escape of pressure through the drain hole 260. Pressure maintained in the reservoir 30 and acting on the ball 266 helps maintain the ball in sealing relationship with the valve seat 264.

As previously mentioned, the vent tube 164 extends from the reservoir 30 down to the filling head. There will be one vent tube for each filling head on the filling machine.

As clearly shown in Figures 1, 10, 25 and 26, when the disk valve 41 is rotated to the position disclosed in Figure 22, gas will flow from the gas portion of the gas and liquid reservoir 18 through the tube 120, passages 116, 130, 70, 134, 200, and will enter the container from the port 204. After the container has received the proper amount of pressure during the counterpressure stage of the filling cycle, the disk valve element 41 is moved to the position disclosed in Figure 23. In Figure 23, the filling and vent stage is disclosed and liquid will flow into the container through the multi-stage liquid passages mentioned previously, under the heading "Filling Head with Multi-Stage Liquid Passages" and the gas in the container is vented therefrom through an entirely different set of passages from those used during the counterpressure stage. During venting the gas in the container C will flow out of the port 204 through the passages 210, 212, 170, 166 and gas tube 164, back to the reservoir 30. By providing separate vent and counterpressure, the shop air in the container never comes in contact with the gas in the gas containing portion of the gas and liquid reservoir 18 and, therefore, does not come into contact with the carbonated liquid therein.

In order to insure accurate liquid flow conditions, when continuously filling containers, a definite relationship between the pressure of the gas in reservoir 30 and the pressure of gas in the gas and liquid reservoir must be maintained. Pressure control device 248 maintains a constant pressure differential at all times between the gas in the gas and liquid reservoir and the gas in the reservoir 30, regardless of whether there is an increase or decrease in pressure in either of the two bodies of gas. It is preferable that the pressure of gas in the reservoir 30 be lower than the pressure of gas in reservoir 18 because if the gas in the two reservoirs were equal to each other, and a container was not completely counterpressured to the exact value, the container would not fill immediately when the disk valve element 41 is opened to the liquid fill stage, as there would be a back flow through the vent passages from reservoir 30 to the container. For the same reason, the pressure of the gas in gas and liquid reservoir 18 should be greater than the pressure of gas in reservoir 30, as the height of fill of containers would be affected, as well as the rate of fill.

In filling containers with a carbonated liquid such as beer, the gas and liquid reservoir 18 is normally pressurized with the gas in the order of 10½ p.s.i. The operating pressure under this condition for the collector ring would be in the order of 10¼ p.s.i., giving a pressure differential of one-quarter p.s.i. If the pressure in the reservoir 18 increases to 10¾ pounds, the check valve in pressure control device 248 would open and permit the flow of gas from the reservoir 18 to the reservoir 30 until the pressure in the reservoir 30 increases to 10½ p.s.i. On the other hand, if the pressure in the reservoir 30 increases, or the pressure in resorvoir 18 decreases, the pressure control device 248 will vent the excess pressure in the reservoir 30 to atmosphere so that the pressure differential of one-quarter p.s.i. will be maintained at all times. A drop in pressure in reservoir 30 will also cause the check valve in pressure control device 248 to open and permit gas to flow from reservoir 18 into reservoir 30 until the pressure builds up to the desired pressure differential.

To initially charge reservoir 30 when the system is first placed in operation, the pressure control device 248 is provided with a hand shut-off 268 which operates the check valve therein to open the same so that the gas can flow from reservoir 18 into reservoir 30 to pressurize the same. When hand valve 268 is released, the check valve and the diaphragm arrangement in the pressure control device 248 will set up and maintain the differential as just previously described. A pressure gauge 270 may be provided on reservoir 30 so that the operator of the filling machine can determine the differential pressure between the reservoir 30 and the gas and liquid reservoir 18.

Container purging prior to filling

A modification of the separate vent and counterpressure system just previously described is disclosed in Figures 27, 28 and 29. It will be noted that the filling head 16 in its filling nozzle 114' is provided with a slightly different arrangement of gas and vent passages. More specifically, gas passage 200' is subdivided in the lower portion of the filling nozzle into a plurality of gas passages 272 opening around the periphery of the lower end 273 of the filling nozzle in between the liquid nozzle tips 226. In more detail, gas passage 200' at its lower end in filling nozzle 114' communicates with a manifold 274, the manifold 274 in turn being connected with each of the plurality of gas passages 272. Each of the gas passages 272 communicates with a port 276 in the lower horizontal face 180 of filling nozzle 114'.

Vent passage 210' is generally the same in construction as the vent passage described in connection with Figure 25 in that it opens to the central port 204 and communicates with the same vent passage in body element 48. However, the portion of vent passage 210 leading off at an angle from the port 204 is provided with a spring closed purge valve 278. The purge valve 278 is of the type having an operating plunger 280 having longitudinal grooves 281 defining air passages, the grooves being closed to the passage 210' when the plunger is spring pressed outwardly by the spring 282. When the plunger 280 is pressed inwardly against spring 282, the grooves 281 will open and permit direct communication between the passage 210' and atmosphere.

The purpose of the system disclosed in Figures 27, 28 and 29 is to purge the containers C of shop air prior to the establishment of counterpressure in the containers so that when liquid flows into the container it will not come into contact with the shop air in the container after establishment of counterpressure. Briefly, the operation of the purging system is as follows: after a container is raised into sealing engagement with the filling nozzle 114' of filling head 16, the valve operating arms 44 will engage a cam or trip on the stationary frame of the filling machine and move the disk valve 41 to the position disclosed in Figure 22. Simultaneously with the engagement of the valve operating arm with the counterpressure trip, the purge valve 278 will also engage a stationary trip 284 mounted on the stationary frame of the filling machine. Assuming that the counterpressure stage would take up 30° of travel of the filling head about the filling machine, the purge valve 278 would be held open for approximately the first 15° of travel. The flow of gas from the reservoir 18 will be through the counterpressure gas passages, as disclosed in Figure 28, downwardly around the walls of the container and upward centrally of the container, forcing the air out of the central port 204 and the purge valve 278. When the purge valve is closed after approximately 15° travel, the counterpressure is then established in the container during the next 15° travel. After counterpressure is established in the container, the filling valve 31 of filling head 16 is then operated and liquid flow and venting will occur in the manner described under the heading "Separate Vent and Counterpressure Filling Machine."

Although the purging of the container has been shown and described in connection with a filling machine incorporating separate vent and counterpressure stages, it will be understood that purging of the container prior to counterpressure, filling and venting could be utilized on filling machines other than the type disclosed herein having separate vent and counterpressure passages and, therefore, would be within the scope of the present invention.

Ball float valve construction

Referring now to Figures 25, 30 and 31, the filling machine of the present invention is provided with a ball float valve to close off the vent passage when liquid in the container has reached a predetermined height. The ball float valve arrangement includes a tubular fitting 286 threaded into the port 204, as indicated at 288. Fitting 286 is provided with an annular valve seat 290 upon which a ball float 292 is adapted to seat. A suitable gasket 294 may be positioned between fitting 286 and the body element 176 of filling nozzle 114 to prevent leakage of gas past the threads 288.

An enlarged counterbore 296 having a shoulder 298 thereon is provided in the lower end portion of filling nozzle 114. Counterbore 296 is adapted to receive a cage member 300, the cage member defining the path of and retaining the ball float 292. The cage member 300 is made of spring wire as shown in Figure 30 and may be snapped upwardly into the counterbore 296 where it rests on the shoulder 298.

Ball float 292 is hollow and is made of a plastic material such as a synthetic linear polyamide. Because the ball float 292 is hollow, it must be made in two semispherical sections 302 and 304, as shown in Figure 31. The shells 302 and 304 are glued together as indicated at 306, forming a circumferential seam at their point of junction. The upper shell 302 is very thin in section, whereas the lower shell 304 is thick in section at the point 308 and progressively thins in section until it matches the upper shell at the seam 306. By having the lower shell thicker in section with a streamlined effect to the lateral seam, the ball float will be self-orienting so that the thin shell 302 will always seat against the annular valve seat 290. When liquid rises into the container and engages the ball float 292, the ball float will have a smooth rolling action rather than a bobbing action, and will always orient itself to a position where the upper shell, as previously mentioned, engages the annular valve seat 290. Because of the rolling action resulting in self-orienting of the ball float, the seam 306 of the ball float 292 will never seat against the valve seat 290 forming an improper seal. Another advantage of providing the ball float with one of the shells thicker than the other shell is that the ball float will float in the liquid at the seam 306 or, in other words, half in the liquid and half out of the liquid. Consequently, the ball float will not prematurely seat against the valve seat 290 if there is foam in the top of the container.

The terminology used in this specification is for the purpose of description and not limitation, the scope of the invention being defined in the claims.

I claim:

1. In a container filling machine, a reservoir for liquid and a superposed body of gas, a second reservoir for a second body of gas, means for maintaining a constant pressure differential between gas in said first reservoir and gas in said second reservoir, a filling head, a container supporting platform arranged to move a container into and out of sealing engagement with the filling head, means operable to place the superposed body of gas in said first reservoir in communication with the container when in sealing engagement with the filling head, means operable at least during the first portion of the operation of said last-mentioned means for venting the container completely of air while gas is flowing into the container, means operable when said last mentioned means is inoperable for causing the flow of liquid from said first reservoir to the container, and means to vent gas from the container to said second reservoir simultaneously while liquid is flowing into the container.

2. A container filling machine of the character described in claim 1 wherein the superposed body of gas in said first reservoir has a pressure higher than the pressure of gas in said second reservoir.

3. A container filling machine of the character described in claim 1 wherein said pressure differential maintaining means maintains the pressure of gas in said first reservoir at a predetermined constant pressure higher than the pressure of gas in said second reservoir and includes means to flow gas from said first reservoir to said second reservoir when pressure of gas in said first reservoir builds up and tends to cause an unbalancing of the constant pressure differential.

4. A container filling machine of the character described in claim 1 wherein said pressure differential maintaining means includes means to relieve the pressure of gas in said second reservoir to atmosphere when the pressure of gas in said second reservoir builds up and tends to cause an unbalancing of the pressure differential.

5. A container filling machine of the character described in claim 1 wherein said pressure differential maintaining means includes means to cause flow of gas from said first reservoir to said second reservoir when pressure in said first reservoir builds up and tends to cause an unbalancing of the pressure differential, and means to vent gas from said second reservoir to atmosphere when the pressure of gas in said second reservoir builds up and tends to cause an unbalancing of the pressure differential.

6. In a container filling machine, a reservoir for liquid and a superposed body of gas, a second reservoir for a second body of gas, a filling head, a container supporting platform arranged to move a container into and out of sealing engagement with the filling head, means operable to place the superposed body of gas in said first reservoir into communication with the container when it is in sealing engagement with the filling head, means operable during a portion of the operation of said last mentioned means for venting the container to atmosphere while gas is flowing from said first reservoir to the container thereby purging the container of air, means to flow liquid from said first mentioned means to the container after said first mentioned means is inoperable, and means to vent gas from the container to said second reservoir simultaneously while liquid is flowing into the container.

7. In a container filling machine, a reservoir for liquid and a superposed body of gas, a second reservoir for a second body of gas, means for maintaining a constant pressure differential between gas in said first reservoir and gas in said second reservoir, a filling head, a container supporting platform arranged to move a container into and out of sealing engagement with the filling head, means operable to place the superposed body of gas in said first reservoir into communication with the container when it is in sealing engagement with the filling head, means operable during a portion of the operation of said last mentioned means for venting the container to atmosphere thereby purging air from the container, means to flow liquid from said first reservoir to the container after the container has been pressurized, means to vent gas from the container to said second reservoir simultaneously while liquid is flowing into the container.

8. A container filling machine of the character described in claim 7 wherein the superposed body of gas in said first reservoir has a pressure higher than the pressure of gas in said second reservoir.

9. In a container filling machine, a reservoir for liquid and a superposed body of gas, a filling head, a container supporting platform arranged to move a container into and out of sealing engagement with the filling head, means operable to place the superposed body of gas in said reservoir into communication with the container when it is in sealing engagement with the filling head, said last mentioned means including circumferentially spaced passages in said filling head for directing flow of gas into the container down the walls of the container, means operable during a portion of the operation of said last mentioned means for venting the container to atmosphere thereby purging the container completely of air prior to filling the container with liquid, said means including a passage in said filling head opening to the interior of the container centrally of said gas passages, means operable after the container has been pressurized to cause flow of liquid from the reservoir to the container while gas in the container is vented therefrom.

10. A container filling machine of the character described in claim 9 wherein said purging means includes a valve mounted on said filling head, said valve being opened during the first portion of operation of said means for placing the superposed body of gas in communication with the container.

11. A method of filling a container with carbonated liquid comprising: maintaining a substantially constant pressure differential between a confined body of gas above a liquid source and a second confined body of gas under a predetermined pressure, flowing gas into the container from the first body of gas until the gas in the container has reached a predetermined pressure, closing such flow of gas to the container after the gas in the container has reached the predetermined pressure, flowing carbonated liquid into the container from the liquid source, and simultaneously flowing the gas in the container to the second body of gas under pressure.

12. A method of filling a container with a carbonated liquid comprising: maintaining a substantially constant pressure differential between a first confined body of gas above a liquid source and a second confined body of gas with the first body of gas having a higher pressure than the second body of gas, flowing gas into the container from the first body of gas until the gas in the container has reached a predetermined pressure, closing such flow of gas to the container after the gas in the container has reached the predetermined pressure, flowing carbonated liquid into the container from the liquid source, and simultaneously flowing the gas in the container to the second body of gas under pressure.

13. A method of the character described in claim 12 wherein the pressure differential between the first body of gas and the second body of gas is maintained in the order of one-quarter (¼) pound p.s.i.

14. A method of filling a container with a carbonated liquid comprising: flowing a gas into the container from a body of gas superposing a source of carbonated liquid, permitting air in the container to flow to atmosphere during a portion of the time gas is flowing into the container and prior to the flow of liquid, closing the flow of gas to the container after the gas in the container has reached a predetermined pressure, flowing carbonated liquid into the container from the liquid source, and simultaneously flowing the gas in the container to a second confined body of gas under pressure.

15. A method of filling a container with carbonated liquid comprising: maintaining a substantially constant pressure differential between a body of gas above a liquid source and a second body of gas, flowing gas into the container from the first body of gas, permitting the container to be opened to atmosphere during a portion of the time gas is flowing into the container to thereby purge the container of air, continuing the flow of gas into the container after the container is closed to atmosphere until the gas in the container has reached a predetermined pressure, closing such flow of gas to the container after the gas in the container has reached the predetermined pressure, flowing carbonated liquid into the container from the liquid source, and simultaneously flowing the gas in the container to the second body of gas under pressure.

16. A method of the character described in claim 15 wherein the pressure differential between the body of gas above the liquid source and the second body of gas is maintained in the order of one-quarter pound p.s.i.

17. A method of the character described in claim 15 wherein the pressure differential between the body of gas over the liquid and the second body of gas is maintained with the pressure of the gas over the liquid being higher than the pressure of the gas of the second body.

18. A method of filling a container with carbonated liquid comprising: maintaining a substantially constant pressure differential between a body of gas above the liquid source and a second body of gas with the pressure of the body of gas above the liquid being higher than the pressure of the second body of gas, flowing gas into the container from the first body of gas until gas in the container has reached a predetermined pressure less than the pressure of the body of gas above the source of liquid, closing such flow of gas to the container after the gas in the container has reached the predetermined pressure less than the pressure of the body of gas above the liquid, flowing carbonated liquid into the container from the liquid source, and simultaneously flowing the gas in the container to the second body of gas under pressure.

19. A method of filling containers with a carbonated liquid comprising: flowing gas from a body of gas superposing a source of carbonated liquid downwardly into a container along the walls of the container, permitting air and gas mixture in the container to flow upwardly centrally of the in-flowing gas out of the container to atmosphere to purge the container of air, stopping the flow out of the container after the container is filled with gas, permitting the flow of gas to continue into the container until the gas in the container reaches a predetermined pressure, closing the flow of gas at a point intermediate the container and the body of gas above the liquid source, then flowing carbonated liquid into the container from the liquid source, and simultaneously venting gas in the container centrally of the in-flowing liquid.

20. A method of filling containers with a carbonated liquid comprising: maintaining a substantially constant pressure differential between a body of gas above the source of liquid and a second body of gas, flowing gas from a first body of gas downwardly into the container adjacent the walls of the container, permitting the flow of gas and air mixture from the container centrally of the in-flowing gas to completely purge the container of air prior to filling the container with liquid, terminating the flow from the container when the container is completely filled with gas, permitting the flow of gas into the container to continue until the gas in the container is at a predetermined pressure, closing such flow of gas into the container at a point intermediate the container and the first body of gas, flowing carbonated liquid into the container from the source of liquid, and simultaneously flowing the gas into the container to the second body of gas under pressure.

21. In a container filling machine, a reservoir for a liquid and a superposed body of gas, a second reservoir for a second body of gas, a filling head, a container supporting platform arranged to move a container into and out of sealing engagement with the filling head, a first gas passage extending from said first reservoir to and through said filling head, said first gas passage being separated into a plurality of gas passages providing multiple circumferentially spaced outlets in said filling head and, a liquid passage extending from said first reservoir to and through said filling head, said liquid passage being separated into multiple liquid passages terminating in spaced outlets in said filling head, a second gas passage extending from said second reservoir to and through said filling head, and valve means in said filling head, said valve means cooperating with said gas and liquid passages to first open said first mentioned gas conduit to place the superposed body of gas above the liquid in said first reservoir in communication with the container, then being operable to close said first mentioned gas passage and open said liquid passage and said second gas conduit to provide liquid flow from said first reservoir to the container while gas in the container is vented therefrom through said second gas passage to said second reservoir.

22. A filling machine of the character described in claim 21 wherein said second gas passage extends through said filling head and terminates in an inlet positioned centrally of the circumferentially spaced outlets of said first gas passage and means cooperating with said second gas passage whereby air in said container may be purged centrally of the container as gas enters the container concentrically thereof.

23. In a rotary filling machine, a base, a table rotatable on said base about a vertical axis, said table including a plurality of filling heads and vertically aligned container supporting platforms, each of said filling heads including a valve body and a valve element rotatable with respect to said valve body about an axis lying in the plane of a radius of said table axis, means to rotate each of said valve elements, said means including a valve operating member operatively keyed to said valve element, said valve operating member being resiliently mounted with respect to said valve element to normally urge the same into seating engagement with said valve body while being movable on an axis normal to the axis of rotation of said valve element, said valve operating member including a pair of operating arms each lying along a line radial of the axis of said valve operating member, trip means carried by said base and spaced about the path of movement of said filling head with said table for engagement with said respective operating arms, each of said valve bodies and its associated valve element including flow passages arranged with respect to said valve operating arms to provide for flow shut-off and fluid flow by movement of said valve element with respect to its valve body.

24. A filling machine of the character described in claim 23 wherein said operating arms include rollers for engagement with said valve trips.

25. A filling machine of the character described in claim 23 wherein each of said filling heads includes spring elements circumferentially spaced about the axis of rotation of said valve element and interposed between said valve element and said valve operating member, said spring elements urging said valve element into sealing engagement with the valve seat of said valve body and providing the resilient mounting between said valve element and said valve operating member.

26. In a filling head adapted for use on a rotary filling machine to fill containers with a liquid, a body element provided with a planar seat face, a filling nozzle on said body element, said body element having a first series of passages opening to said seat face and adapted to communicate with a gas and liquid reservoir of the filling machine, and a second series of passages extending from said nozzle and opening to said seat face, a disk valve element rotatable on said seat face, said disk valve element including passages therein adapted to align said first and second series of passages for fluid flow when rotated, means to rotate said disk valve element, said means including a valve operating member keyed to and resiliently mounted with respect to said disk valve element, said member including a pair of operating arms adapted to engage trips on the filling machine.

27. A filling head of the character described in claim 26 wherein said operating arms include rollers mounted on their outer ends adapted to cooperate with said trips.

28. In a filling head adapted for use with a rotary filling machine, a body element provided with a planar seat face, a filling nozzle on said body element, said body element having a first series of passages opening to said seat face and adapted to communicate with a gas and liquid reservoir of the filling machine, and a second series of passages extending from said nozzle and opening to said seat face, a disk valve element rotatable on said seat face, said disk valve element including passages therein adapted to align said first and second series of passages for fluid flow when rotated, means to rotate said disk valve element, said last mentioned means including a valve operating member having operating arms thereon, said member being keyed to said disk valve element, and a spring means positioned between said member and said disk valve element to urge said disk valve element into seating engagement with said planar seat face.

29. A filling head of the character described in claim 28 wherein said spring means includes a plurality of coil springs circumferentially spaced about the axis of rotation of said disk valve element.

30. A filling head of the character described in claim 28 wherein said spring means includes a plurality of coil springs circumferentially spaced about the axis of rotation of said disk valve and wherein said operating member is provided with a plurality of circumferentially spaced bores closed at one end, each of said bores being adapted to receive one of the ends of said coil springs.

31. In a filling head adapted for use with a rotary filling machine, a body element provided with a planar seat face, a filling nozzle on said body element, said body element having a first series of passages opening to said seat face and adapted to communicate with a gas and liquid reservoir of the filling machine, and a second series of passages extending from said nozzle and opening to said seat face, a stationary spindle extending outwardly from the planar seat face of said body element, a disk valve element rotatable on said spindle and cooperating with said seat face, said disk valve element including passages therein adapted to align said first and second series of passages for fluid flow when it is rotated, a valve operating member including valve operating arms rotatably mounted on said spindle, said valve operating member being keyed to said disk valve element to thereby rotate the same, means to retain said valve operating member on said spindle, and spring means interposed between said valve operating member and said disk valve element to urge said disk valve element into seating arrangement with said valve seat and permit axial movement between said valve operating member and said disk valve element.

32. A filling head of the character described in claim 31 wherein said spring means includes a plurality of coil springs circumferentially spaced about the axis of rotation of said disk valve element.

33. In a filling head for a carbonated liquid, a body element provided with a seat face, a filling nozzle on said body element, a valve element rotatable on said body element and cooperating with the seat face, a first pair of gas passages opening to said seat face, at least one of said first pair of gas passages being adapted to communicate with the gas containing portion of a gas and liquid reservoir, said body element further including a first liquid passage opening from its seat face and adapted to communicate with the liquid containing portion of a gas and liquid reservoir, said body element including a second pair of gas passages and a second liquid passage extending from said seat face to said filling nozzle, said valve element including gas and liquid passages and being rotatable to respectively align the gas and liquid passages to first establish counterpressure in a container sealed to said filling nozzle and then provide liquid flow and venting, and at least said second liquid passage being brass to thereby increase its wetting characteristics and thus provide an increased coefficient of capillarity so that a prime of liquid will remain therein when said first and second liquid passages are out of alignment.

34. In a filling head for a carbonated liquid, a body element provided with a planar seat face, a filling nozzle on said body element, a disk valve rotatable on said body element seat face, said body element including a first pair of gas passages opening to said seat face and at least one of said first pair of passages being adapted to communicate with the gas containing portion of a gas and liquid reservoir, said body element further including a first liquid passage opening from its seat face and adapted to communicate with the liquid containing portion of a gas and liquid reservoir, said body element including a second pair of gas passages from said seat face to said filling nozzle, said body element also including a second liquid passage extending from said seat face and branching into a plurality of liquid passages in said filling nozzle, said plurality of liquid passages in said filling nozzle having a total cross-sectional area less than the cross-sectional area of said first and second liquid passages, said disk valve including a gas passage and a liquid passage and being rotatable to respectively align its gas passage with a gas passage of each of said pairs of body element gas passages to establish counterpressure in a container sealed to said filling nozzle, and then rotated to align its gas passage with the other gas passage of each of said pairs of body element gas passages and to align said disk valve liquid passage with said body element liquid passages for respective flow of gas from and liquid to the container.

35. A filling head of a character described in claim 34 wherein said plurality of liquid passages in said filling nozzle are brass to thereby increase their wetting characteristics and thus provide an increased coefficient of capillarity so that a prime of liquid will remain therein when said first and second liquid passages are out of alignment.

36. In a filling head for a carbonated liquid, a body element provided with a seat face and a downwardly extending filling nozzle having a substantially horizontal face, a valve element rotatably mounted on said body element seat face, said body element including a first pair of gas passages opening to said seat face and having at least one of said pair of passages adapted to communicate with the gas containing portion of a gas and liquid reservoir, said body element further including a first liquid passage opening perpendicularly from its seat face and then extending at an angle thereto and adapted to communicate with the liquid containing portion of a gas and liquid reservoir, said body element including a second pair of gas passages from said seat face to said filling nozzle, said body element also including a second liquid passage extending perpendicularly from said seat face and then at right angles downwardly to said nozzle, said second liquid passage branching into a plurality of circumferentially spaced liquid passages in said filling nozzle, the plurality of liquid passages in said filling nozzle having a total cross-sectional area less than the cross-sectional area of said second liquid passage, said valve element including at least one gas passage and a liquid passage and being rotatable respectively to align its gas passage with a gas passage of each of said pairs of body element gas passages to establish counterpressure in a container sealed to the horizontal face of said nozzle, and then rotated to align its gas passage with the other gas passage of each of said pairs of body element gas passages and to align said valve element liquid passage with said body element liquid passages for respective flow of gas from and liquid to the container.

37. A filling head of the character described in claim 36 wherein one of said second pairs of gas passages branches into a plurality of gas passages in said nozzle, said plurality of gas passages in said nozzle being spaced circumferentially of said nozzle whereby gas flowing into a container in sealing engagement with said nozzle will flow downwardly about the walls of the container, and wherein the other of said second pairs of gas passages is positioned centrally of said plurality of gas passages in said nozzle and opens axially of the horizontal face of said nozzle.

38. A filling head of the character described in claim 37 wherein said gas passage positioned centrally of the plurality of gas passages in said nozzle is provided with a valve seat, and a float valve supported below the horizontal face of said nozzle and adapted to be seated against said last mentioned valve seat when liquid flowing into a container reaches a predetermined height.

39. A filling head of the character described in claim 38 wherein said float valve is a hollow ball which is self-orienting.

40. In a filling head for filling containers with a carbonated liquid, a body element provided with a planar seat face, a filling nozzle on said body element, a disk valve rotatable on said body element seat face, said body element including gas passages opening to said seat face and adapted to communicate with the gas containing portion of a gas and liquid reservoir, said body element further including a first liquid passage extending perpendicularly from its seat face and then at an angle to its seat face and being adapted to communicate with the liquid containing portion of a gas and liquid reservoir, said body element further including gas passages opening from said seat face and extending to said filling nozzle, said body element also including a second liquid passage extending perpendicularly from said seat face and then downwardly to said filling nozzle, said disk valve including a gas passage and a liquid passage and being rotatable to respectively align its gas passage with the body element gas passages to establish counterpressure in a container sealed to said filling nozzle and then to align its gas passage with the body element gas passages and its liquid passage with the body element liquid passages to cause flow of liquid to said filling nozzle and return flow of gas, said body element liquid passages being rounded where they change direction to thereby eliminate turbulence when there is liquid flow.

41. A filling head of the character described in claim 40 wherein said disk valve liquid passage extends perpendicularly from its seat face, then parallel to its seat face and then perpendicular back to its seat face, said disk valve liquid passage being rounded where it changes direction.

42. In a filling head for a carbonated liquid, a body element provided with a seat face, a nozzle extending from said body element, a valve element cooperating with said body element seat face, a liquid passage extending from said nozzle to said seat face, a second liquid passage extending from said seat face and adapted to communicate with the liquid portion of a gas and liquid reservoir, at least one gas passage extending from said nozzle to said body element seat face, a second gas passage extending from said body element seat face and adapted to be in communication with the gas portion of a gas and liquid reservoir, said valve element being rotatable to first align said body element gas passages to establish counterpressure in a container in sealing engagement with a nozzle and then rotatable to a position wherein said body element liquid passages are in alignment and said body element gas passages are in alignment whereby there is liquid flow to the nozzle and gas flow from the nozzle, a hollow ball float valve supported on said nozzle and cooperating with the gas passage therein to close off the same when liquid has reached the predetermined height in a container, said ball float valve being self-orienting.

43. A filling head of the character described in claim 42 wherein said ball float valve includes an upper semi-spherical portion seamed to a lower semi-spherical portion, the upper portion having a wall thickness less than the wall thickness of the lower portion whereby the ball float valve will submerge in liquid to the seam of the upper and lower portions.

44. A filling head of the character described in claim 42 wherein said hollow ball float valve includes an upper semi-spherical portion seamed to a lower semi-spherical portion, the lower semi-spherical portion being thicker at its lowest point than the upper semi-spherical portion and being progressively thinner in section as it approaches its seam with the upper semi-spherical portion.

45. In a filling head for a carbonated liquid, a body element including a filling nozzle adapted to seal with a container, said body element having at least one gas passage therein adapted to provide communication between the gas containing portion of a gas and liquid reservoir and a container in sealing engagement with said filling nozzle, said body element also having a liquid passage therein adapted to provide communication between the liquid containing portion of a gas and liquid reservoir and a container in sealing engagement with said filling nozzle, said liquid passage including a single liquid conduit adapted for communication with the liquid in the liquid and gas reservoir, said single liquid conduit branching into a first series of multiple conduits, each of said first series of multiple conduits again branching into a second series of multiple conduits, said first series of multiple conduits having a total outlet cross-sectional area less than the cross-sectional area of said first conduit and said second series of multiple conduits having a total outlet cross-sectional area less than the total cross-sectional outlet area of said first series of multiple conduits, and valve means on said filling head cooperating with said gas and liquid passages to first open said gas passage to establish counterpressure in a container in sealing engagement with said filling nozzle and then to open said liquid and gas passages to provide flow of liquid into a container and flow of gas from a container.

46. A filling head of the character described in claim 45 wherein said second series of multiple conduits have walls of brass to thereby increase their wetting characteristics and thus provide an increase coefficient of capillarity so that a prime of liquid will remain therein when said liquid passage is closed by said valve means.

47. In a rotary filling machine of the type for filling containers with a carbonated liquid, a base, a table rotatable on said base about a vertical axis, said table including a reservoir for liquid and a superposed body of gas, a plurality of filling heads operatively connected to said reservoir, and a plurality of container supporting platforms positioned below and in alignment with said filling heads, each of said filling heads including a valve body and a valve element rotatable with respect to said valve body about an axis lying in the plane of a radius of said table axis, means to rotate each of said valve elements, said means including a valve operating member operatively keyed to said valve element, said valve operating member being resiliently mounted with respect to said valve element to urge the same into seating engagement with said valve body and being movable on an axis normal to the axis of rotation of said valve element, said valve operating member including a pair of operating arms each lying along a line radial of the axis of said valve operating member, trip means carried by said base and spaced about the path of movement of said filling heads with said table for engagement with said respective valve operating arms, each of said valve bodies and its associated valve element including liquid flow and gas flow passages arranged with respect to said valve operating arms to provide for liquid and gas flow shut off, liquid flow and gas flow, by movement of said valve element with respect to its valve body.

48. A filling machine of the character described in claim 47, wherein each of said filling heads includes spring elements circumferentially spaced about the axis of rotation of said valve element and interposed between said valve element and said valve operating member, said spring elements urging said valve element into seating engagement with the valve seat of said valve body and providing the resilient mounting between said valve element and said valve operating member.

49. A filling head for filling a container with carbonated liquid comprising: a body element including a nozzle portion extending downwardly and having a substantially horizontal face for sealing engagement with a container to be filled, said body element having a liquid passage and a venting passage therein extending through said nozzle portion, valve means for opening said liquid and said venting passage, and a hollow ball float valve supported on said nozzle and cooperating with the venting passage therein to close off the same when liquid has reached a predetermined height in the container being filled, said ball float valve being self-orienting.

50. A filling head for filling a container with carbonated liquid comprising: a body element including a nozzle portion extending downwardly and having a substantially horizontal face for sealing engagement with a container to be filled, said body element having a liquid passage and a venting passage therein extending through said nozzle portion, valve means for opening said liquid and said venting passage, and a hollow ball float valve supported on said nozzle and cooperating with the venting passage therein to close off the same when liquid has reached a predetermined height in the container being filled, said ball float valve being self-orienting and including an upper semi-spherical portion and a lower semi-spherical portion seamed thereto, said lower semi-spherical portion being heavier than said upper semi-spherical portion.

51. A filling head for filling a container with carbonated liquid comprising: a body element including a nozzle portion extending downwardly and having a substantially horizontal face for sealing engagement with a container to be filled, said body element having a liquid passage and a venting passage therein extending through said nozzle portion, valve means for opening said liquid and said venting passage, and a hollow ball float valve supported on said nozzle and cooperating with the venting passage therein to close off the same when liquid has reached a predetermined height in the container being filled, said ball float valve being self-orienting and including an upper semi-spherical portion seamed to a lower semi-spherical portion, the upper portion having a wall thickness less than the wall thickness of the lower portion.

52. A filling head for filling a container with carbonated liquid comprising: a body element including a nozzle portion extending downwardly and having a substantially horizontal face for sealing engagement with a container to be filled, said body element having a liquid passage and a venting passage therein extending through said nozzle portion, valve means for opening said liquid and said venting passage, and a hollow ball float valve supported on said nozzle and cooperating with the venting passage therein to close off the same when liquid has reached a predetermined height in the container being filled, said ball float valve being self-orienting and including an upper semi-spherical portion seamed to a lower semi-spherical portion, the lower semi-spherical portion being thicker at its lowest portion than the upper semi-spherical portion and being progressively thinner in section as it approaches its seam with the upper semi-spherical portion.

53. In a container filling machine, a reservoir for a liquid and a superposed body of gas, a second reservoir for a second body of gas, a filling head, a container supporting platform arranged to move a container into and out of sealing engagement with the filling head, a first gas passage extending from said first reservoir to and through said filling head, a liquid passage extending from said first reservoir to and through said filling head, a second passage extending from said second reservoir to and through said filling head, and valve means in said filling head, said valve means cooperating with said gas and liquid passages to first open said first mentioned gas conduit to place the superposed body of gas above the liquid in said first reservoir in communication with the container, then being operable to close said first mentioned gas passage and open said liquid passage and said second gas conduit to provide liquid flow from said first reservoir to the container while gas in the container is vented therefrom through said second gas passage to said second reservoir, means to place the interior of the container in open communication with atmosphere when said valve means is operable to a position to place the superposed body of gas above the liquid in said first reservoir in communication with the container, said last mentioned means being operable a sufficient length of time to permit purging of air from the container.

References Cited in the file of this patent

UNITED STATES PATENTS

| | | |
|---|---|---|
| 1,919,665 | Muller | July 25, 1933 |
| 2,060,276 | Bondurant | Nov. 10, 1936 |
| 2,063,326 | Meyer | Dec. 8, 1936 |
| 2,109,489 | Le Frank | Mar. 1, 1938 |
| 2,187,332 | Sinz | Jan. 16, 1940 |
| 2,295,263 | Le Bleu | Sept. 8, 1942 |
| 2,382,696 | Milleville | Aug. 14, 1945 |
| 2,548,589 | Chelle | Apr. 10, 1951 |
| 2,563,863 | Nordquist | Aug. 14, 1951 |
| 2,615,607 | Huskey | Oct. 28, 1952 |
| 2,640,640 | Meyer | June 2, 1953 |
| 2,660,358 | Fechheimer | Nov. 24, 1953 |
| 2,679,346 | Breeback | May 25, 1954 |
| 2,728,511 | Breeback | Dec. 27, 1955 |
| 2,754,043 | Casigliani | July 10, 1956 |
| 2,770,263 | Breeback | Nov. 13, 1956 |